(12) United States Patent
Russo et al.

(10) Patent No.: US 8,980,218 B2
(45) Date of Patent: Mar. 17, 2015

(54) MAGHEMITE NANOPARTICLES AND METHOD FOR PREPARING THEREOF

(75) Inventors: Umberto Russo, Padua (IT); Luca Nodari, Vicenza (IT); Fabio Vianello, Venice (IT); Massimiliano Magro, Vigonovo (IT); Giorgio Valle, Arqua' Petrarca (IT)

(73) Assignees: Universita' Degli Studi di Padova, Padova (IT); Fabio Vianello, Venezia (IT); Massimiliano Margo, Vigonovo (IT); Giorgio Valle, Arqua' Petrarca (IT)

( * ) Notice: Subject to any disclaimer, the term of this patent is extended or adjusted under 35 U.S.C. 154(b) by 0 days.

(21) Appl. No.: 13/811,112

(22) PCT Filed: Jul. 20, 2010

(86) PCT No.: PCT/EP2010/060486
§ 371 (c)(1),
(2), (4) Date: Jan. 18, 2013

(87) PCT Pub. No.: WO2012/010200
PCT Pub. Date: Jan. 26, 2012

(65) Prior Publication Data
US 2013/0122303 A1    May 16, 2013

(51) Int. Cl.
*C01G 49/06*    (2006.01)
*B82Y 25/00*    (2011.01)
(Continued)

(52) U.S. Cl.
CPC ............... *C01G 49/06* (2013.01); *B82Y 25/00* (2013.01); *B82Y 30/00* (2013.01); *H01F 1/0045* (2013.01); *B22F 2998/00* (2013.01); *C01P 2002/72* (2013.01); *C01P 2002/82* (2013.01); *C01P 2004/04* (2013.01); *C01P 2004/51* (2013.01); *C01P 2004/64* (2013.01); *C01P 2006/42* (2013.01); *H01F 1/342* (2013.01); *Y10S 977/773* (2013.01); *Y10S 977/774* (2013.01)
USPC ........................ 423/633; 977/774; 977/773

(58) Field of Classification Search
CPC ..... H01F 1/0018; H01F 10/14; H01F 10/131; C01G 49/06; C01P 2006/42; C01P 2004/64
USPC .......................................... 977/774; 423/633
See application file for complete search history.

(56) References Cited

U.S. PATENT DOCUMENTS 7,202,667 B2 * 4/2007 Barbic ........................ 324/318

OTHER PUBLICATIONS

Fan, Jinda, and Yong Gao. "Nanoparticle-supported catalysts and catalytic reactions—a mini-review." Journal of Experimental Nanoscience 1.4 (2006): 457-475.*

(Continued)

*Primary Examiner* — Richard M Rump
(74) *Attorney, Agent, or Firm* — Gifford, Krass, Sprinkle, et al.

(57) ABSTRACT

The present application relates to a method for preparing stoichiometrically pure maghemite iron superparamagnetic nanoparticles. The method for preparing maghemite ($\gamma$-$Fe_2O_3$) superparamagnetic nanoparticles disclosed in the present application is characterized by a step of reduction and appropriate steps of oxidation of the Fe-based composition obtained by the same. The maghemite nanoparticles obtained show a suitable size as well as binding properties without any surface modification. These nanoparticles can be therefore easily used as reagents for detection of inorganic and/or organic molecules as well as nanocarriers of organic and/or biomolecules.

10 Claims, 11 Drawing Sheets

(51) Int. Cl.
*B82Y 30/00* (2011.01)
*H01F 1/00* (2006.01)
*H01F 1/34* (2006.01)

(56) References Cited

OTHER PUBLICATIONS

Kluchova, Katerina, et al. "Superparamagnetic maghemite nanoparticles from solid-state synthesis—their functionalization towards peroral MRI contrast agent and magnetic carrier for trypsin immobilization." Biomaterials 30.15 (2009): 2855-2863.*

Tuček, Jiří, Radek Zboril, and Dimitris Petridis. "Maghemite nanoparticles by view of Mössbauer spectroscopy." Journal of nanoscience and nanotechnology 6.4 (2006): 926-947.*

Yang et al: "Stability of nanoiron slurries and their transport in the subsurface environment" Separation and Purification Technology, Elsevier Science, Amsterdam, J. Seppur. 2007.07.018, vol. 58, No. 1, Oct. 23, 2007, pp. 166-172.

Sulek F et al: "Surface functionalization of silica-coated magnetic nanoparticles for covalent attachment of cholesterol oxidase" Journal of Magnetism and Magnetic Materials Elsevier Science B.V. Netherlands, vol. 322, No. 2, Jan. 2010, pp. 179-185.

Iida H et al: "A novel approach for preparation of [gamma]-Fe2O3 nanoparticles: Successive reduction-oxidationin reverse micelles" Meeting Abstracts—2004 Joint International Meeting—206th Meeting of the Electrochemical Societyof Japan, MA Feb. 2004 2004 Electrochemical Society Inc. US, 2004, p. 1149, XP002600806 the whole document.

Cannas C et al: "New Synthesis of Ferrite-Silica Nanocomposites by a Sol-Gel Auto-Combustion" Journal of Nanoparticle Research; An Interdisciplinary Forum for Nanoscale Science and Technology, Kluwer Academic Publishers, DO, vol. 6, No. 2, Jun. 1, 2004, pp. 223-232, XP019260131.

International Search Report, dated Sep. 28, 2010, Application No. PCT/EP2010/060486, Filed on Jul. 20, 2010, 6 pages.

* cited by examiner

MAGHEMITE NANOPARTICLES AND METHOD FOR PREPARING THEREOF

CROSS-REFERENCE TO RELATED APPLICATIONS

This application is the U.S. National Phase of PCT/EP2010/060486 filed Jul. 20, 2010.

FIELD OF THE INVENTION

The present invention relates to a method for preparing stoichiometric pure maghemite iron superparamagnetic nanoparticles, to the same nanoparticles obtainable with the method and the use thereof.

BACKGROUND OF THE INVENTION

With the rapid development of nanotechnology, magnetic nanoparticles are currently being widely studied. It has long been known that the physico-chemical properties of magnetic nanoparticles can be vastly different from those of the corresponding bulk material (Selvan, S. T. et al., 2002, *Phys. Chem. B*, 106, 10157-10162).

As a result, the magnetic nanoparticles will display superparamagnetism, which means that, depending on temperature and dimensions, the particles are attracted by a magnetic field, but retain no residual magnetism after the field is removed (Stavroyiannis, S. et al., 1998, *Appl. Phys. Lett.*, 73, 3453-3458). Therefore, suspended superparamagnetic particles can be removed from the suspension by an external magnet, but they do not agglomerate (i.e. they stay suspended) after removal of the external magnetic field. These nanoparticular materials often exhibit very interesting electrical, optical, magnetic, and chemical properties, which cannot be achieved by their bulk counterparts (Ashoori, R. C., 1996, *Nature*, 379, 413-419).

Magnetic iron oxide nanoparticles were proposed as magnetic pigments in recording and magnetic storage media, catalysis, magnetic fluids, magneto-optical devices, controlled drug delivery, image intensifying agents for nuclear magnetic resonance imaging and magnetic induced cancer therapy (Machala, L. et al., 2007, *J. Phys. Chem. B*, 111, 4003-4018). The perceived advantage of using particles of nanometric size instead of micro- or sub-micrometric size is their larger surface area for the attachment of the enzymes, enabling the preparation of nanostructured biomaterial with a high bio-element loading per mass unit. The others advantages consist of the simple and fast possibility to immobilize bioelements, that can be implemented just before doing a biosensing experiment, and the straightforward adjustment of the amount of antibody magnetically deposited on the electrode surface.

The development of uniform nanometer sized particles has been intensively pursued because of their technological and fundamental scientific importance. There have been various methods developed for the preparation of paramagnetic nanoparticles (Mornet, S. et al., 2004, *J. Mater. Chem.*, 14, 2161-2175; Laurent, S. et al. 2008, *Chem Rev.*, 108, 2064-2110). Among the chemical methods reported in literature and currently used to synthesize magnetic nanoparticles for medical applications, the following can be found: microemulsion technology, sok gel syntheses, sonochemical reactions, hydrothermal reactions, hydrolysis and thermolysis of iron complex precursors, flow injection syntheses and electrospray syntheses (Laurent, S. et al. 2008, *Chem Rev.*, 108, 2064-2110).

The most commonly used protocol involves co-precipitation of ferrous and ferric ions in basic solutions. In most cases, in order to prevent particle aggregation during synthesis, to optimize dimension homogeneity, and to permit bioelement immobilization, a water-in-oil reverse micelle suspension is used, with the aid of a surfactant molecule (Capek, I., 2004, *Adv. Coll. Interf. Sci.*, 110, 49-74). Polymers such as dextran, polyvinyl alcohol, and diethyl-aminoethyl-starch were added to coat the particles for better stability, before or after the formation of iron oxide particles (Lee, J. et al., 1996, *J. Coll. Interf. Sci.*, 177, 490-494; Bergemann, C. et al., 1999, *J. Magn. Magn. Mater.* 194, 45-52).

Furthermore, particles such as crosslinked iron oxide (CLIO) (Wunderbaldinger, P. et al., 2002, *Acad. Radiol.*, 9, 5304-5306; Schellenberger, E. A. et al., 2002, *Mol. Imaging*, 2, 102-107), ultrasmall superparamagnetic iron oxide (USPIO) (Kooi, M. E. et al., 2003, *Circulation*, 107, 2453-2458; Keller, T. M. et al., 2004, *Eur. Radiol.*, 14, 937-944), and monocrystalline iron oxide nanoparticles (MIONs) (Funovics, M. A. et al., 2004, *Magn. Reson. Imaging*, 22, 843-850; Krause, M. E. et al., 2004, *Magn. Reson. Imaging*, 22, 779-787) had all been developed as imaging agents in magnetic resonance imaging (MRI). Depending on surface functionalities introduced on particle surface, some of the particles are likely to be taken up by macrophages and immune cells, and can be used to image lymph nodes and inflammatory tissues. In other studies, specific ligands were attached on the particle surface, in order to image the localization pattern of the target molecules (Schellenberger, E. A. et al., 2002, *Mol. Imaging*, 2, 102-107).

Otherwise, magnetic nanoparticles can be coated with silica and the hydrolyzed silica surface contains a high coverage of silanol groups, which can easily be anchored with defined and generic surface chemistries (Laurent, S. et al. 2008, ref. cit.).

However, the synthesis of superparamagnetic nanoparticles is a complex process because of the colloidal nature of their dispersions. The first main chemical challenge consists of finding out experimental conditions, leading to a monodisperse population of magnetic grains of suitable size. The second critical point is to identify a reproducible process that can be industrialized without any complex purification procedure, such as ultracentrifugation, size-exclusion chromatography, magnetic filtration, or flow field gradient. Furthermore, nanoparticles should not aggregate in water and should form stable suspensions in water.

SUMMARY OF THE INVENTION

To address the drawbacks of the prior arts for making water monodispersed iron oxide nanoparticles, the present invention provides a method of preparation of maghemite iron oxide superparamagnetic nanoparticles and the maghemite iron oxide superparamagnetic nanoparticles themselves. The method and the maghemite iron oxide superparamagnetic nanoparticles have been shown capable to meet the needs previously reported. In addition the method of the invention provides maghemite nanoparticles capable to bind molecules, such as probes and/or biomolecules, without any surface modification, easily and reversibly. Therefore, it is an object of the present invention to provide a simple and inexpensive method for preparing maghemite iron oxide superparamagnetic nanoparticles.

Yet, it is another object of the present invention to provide maghemite iron oxide superparamagnetic nanoparticles, where said nanoparticles are highly monodispersible in water suspension and suitable to bind to organic and/or biological molecules without any surface modification.

Therefore, in a first aspect it is an object of the present invention a method for preparing maghemite ($\gamma$-$Fe_2O_3$) superparamagnetic nanoparticles comprising the steps of:

a) reducing $Fe^{(3+)}$ ions by treating at room temperature aqueous solutions of $Fe^{(3+)}$ salts with an ammonia aqueous solution of sodium borohydride ($NaBH_4$) and then heating the reaction mixture up to 100° C. and keeping the same at this temperature for a time comprised from 0.5 to 5.0 hours, producing a Fe-based composition of matter comprising amorphous $Fe^{(0)}$-containing nanoparticles;

b) oxidizing the Fe-based composition comprising amorphous $Fe^{(0)}$-containing nanoparticles obtained in a) by aging under stirring, at room temperature, a water suspension of said composition for a time comprised from 24 to 96 hours, leading to Fe-based composition of matter comprising black maghemite $Fe^{(3+)}$-containing nanoparticles;

c) ageing the $Fe^{(3+)}$-based composition of matter comprising the black maghemite $Fe^{(3+)}$-containing nanoparticles under stirring at room temperature a water suspension of the same for a time comprised from 24 to 96 hours, obtaining Fe-based composition of matter comprising red-brown stoichiometrically pure maghemite $Fe^{(3+)}$-based nanoparticles;

d) separating and washing the stoichiometric maghemite ($\gamma$-$Fe_2O_3$) superparamagnetic nanoparticles obtained.

The entire process is conducted under an air atmosphere, and, then, in presence of oxygen, being the oxygen an element necessary for the steps of aging. Optionally, in order to isolate the intermediates of the process Fe-based composition of matter comprising amorphous $Fe^{(0)}$-containing nanoparticles and/or Fe-based composition of matter essentially consisting of black maghemite $Fe^{(3+)}$-based nanoparticles, a first step of separation and washing can be added between the step a) and b) with the achievement of an amorphous $Fe^{(0)}$-containing nanoparticle material, where this material is an intermediate characterized by a high stability at room temperature under dry conditions, as well as a second step of separation and washing can be added between the step b) and c) with the achievement of a substantially pure black maghemite $Fe^{(3+)}$-based nanoparticle material.

In addition optionally, the step c) can be alternatively replaced with an annealing step consisting of heating the Fe-based composition of matter comprising black maghemite $Fe^{(3+)}$-based nanoparticles obtained at the step b) at temperatures comprised from 350 and 450° C. for a time comprised from 20 min. to 2 hours. With the preparation method herein disclosed, stoichiometrically pure maghemite ($\gamma$-$Fe_2O_3$) superparamagnetic nanoparticles are obtainable.

Hence, in a second aspect it is a further object of the present invention maghemite $\gamma$-$Fe_2O_3$ superparamagnetic nanoparticles characterized by:

the stoichiometric formula of $(Fe^{3+})^T(Fe^{3+}_{5/3}\ o_{1/3})^H O_4$, where "o" stands for vacancies, and T and H for tetrahedral and octahedral positioning, as determined by zero field and in-field (5 T) Mössbauer spectroscopy in the temperature range 5-300 K;

a size distribution comprised in a range from 5 to 50 nm.

The stoichiometrically pure maghemite $\gamma$-$Fe_2O_3$ superparamagnetic nanoparticles of the invention exhibit the typical magnetization feature of the maghemite and its own feature of surface potential.

Therefore, the stoichiometrically pure maghemite $\gamma$-$Fe_2O_3$ superparamagnetic nanoparticles are further characterized by:

a maximum and a minimum magnetization (at +7 and −7 T) at 2 K of 77 and −77 emu/g, respectively, a coercivity, under the same conditions, of 220 and −220 Oe, and a remnant magnetization of 21 and −21 emu/g; and a surface zeta ($\zeta$) potential (as electrokinetic potential in colloidal systems), measured in potassium phosphate buffer at pH 7.4, in a range −10÷−30 mV).

These maghemite nanoparticles prepared with the method of the invention have, in particular, a mean size from 10 to 12 nm, a polydispersity index comprised from 1.02 to 1.05 and are characterized by a specific chemical behavior, such as the capability to form stable colloidal suspensions in water and to bind in a reversible way to organic and biological molecules.

Further main characteristics of the above mentioned stoichiometrically pure maghemite ($\gamma$-$Fe_2O_3$) nanoparticles are: i) the property to form stable suspensions in water without any surface modification to stabilize said nanoparticles obtained; and ii) the high capability to form monodispersions in water having the polydispersity index previously indicated, as shown by transmission electron microscopy. These bare stoichiometric maghemite ($\gamma$-$Fe_2O_3$) nanoparticles are able to bind reversibly to numerous organic and biological molecules, again without any surface modification by macromolecule shielding. In particular, they show high affinity towards amino, phosphate and carboxylic groups. This type of bare stoichiometric maghemite ($\gamma$-$Fe_2O_3$) nanoparticles are stable in suspension and, presenting a high average magnetic moment, can be easily driven by a magnet.

These properties of the stoichiometric pure maghemite ($\gamma$-$Fe_2O_3$) based superparamagnetic nanoparticles according to the invention render the same particularly useful as magnetically in-situ driveable nanocarriers for organic molecules and/or biomolecules and a combination thereof, such as detectable probes, in particular fluorescent probes, ATP, ADP, AMP, nucleic acids (selected sequences of DNA and RNA), peptides, proteins, enzymes and antibodies.

As far as the use is concerned, in fact, the stoichiometrically pure maghemite nanoparticles of the invention can bind reversibly, without any surface modification, a number of molecules, both organic and biological, having amino, phosphate and carboxylic functional groups by binding selected molecule(s), by coordination bonds.

Hence, the stoichiometrically pure maghemite nanoparticles of the invention can be used to develop reagents and procedures drawn to for example: i) to detect and/or to easily isolate biological molecules, and in particular DNA, peptides, proteins, enzymes and antibodies from biological samples; ii) to prepare magnetic nanocarrier for enzyme ligands, such as substrate or inhibitors; iii) to prepare an affinity binding carrier for the purification of enzymes from biological samples; iv) to prepare fluorescent, magnetically drivable, immobilized enzymes as catalyst; v) to bind ATP from buffered media; vi) to remove environmental pollutants from water and soil. Hence, the stoichiometrically pure maghemite nanoparticles of the invention can be use as: reagents for detection and binding inorganic and/or organic molecules; nanocarriers and/or nanocatalysts, even magnetically in situ driveable; magnetic amplification means for piezoelectric detection.

Other characteristics and advantages of the present invention will be described in the following detailed description of possible, but not exclusive, embodiments of iron oxide based superparamagnetic nanoparticles and of a method to prepare thereof. The iron oxide based superparamagnetic nanoparticles and the method of preparation thereof according to the present invention are herein provided for illustrative purpose and then non-limiting.

DEFINITION

Figure 1:
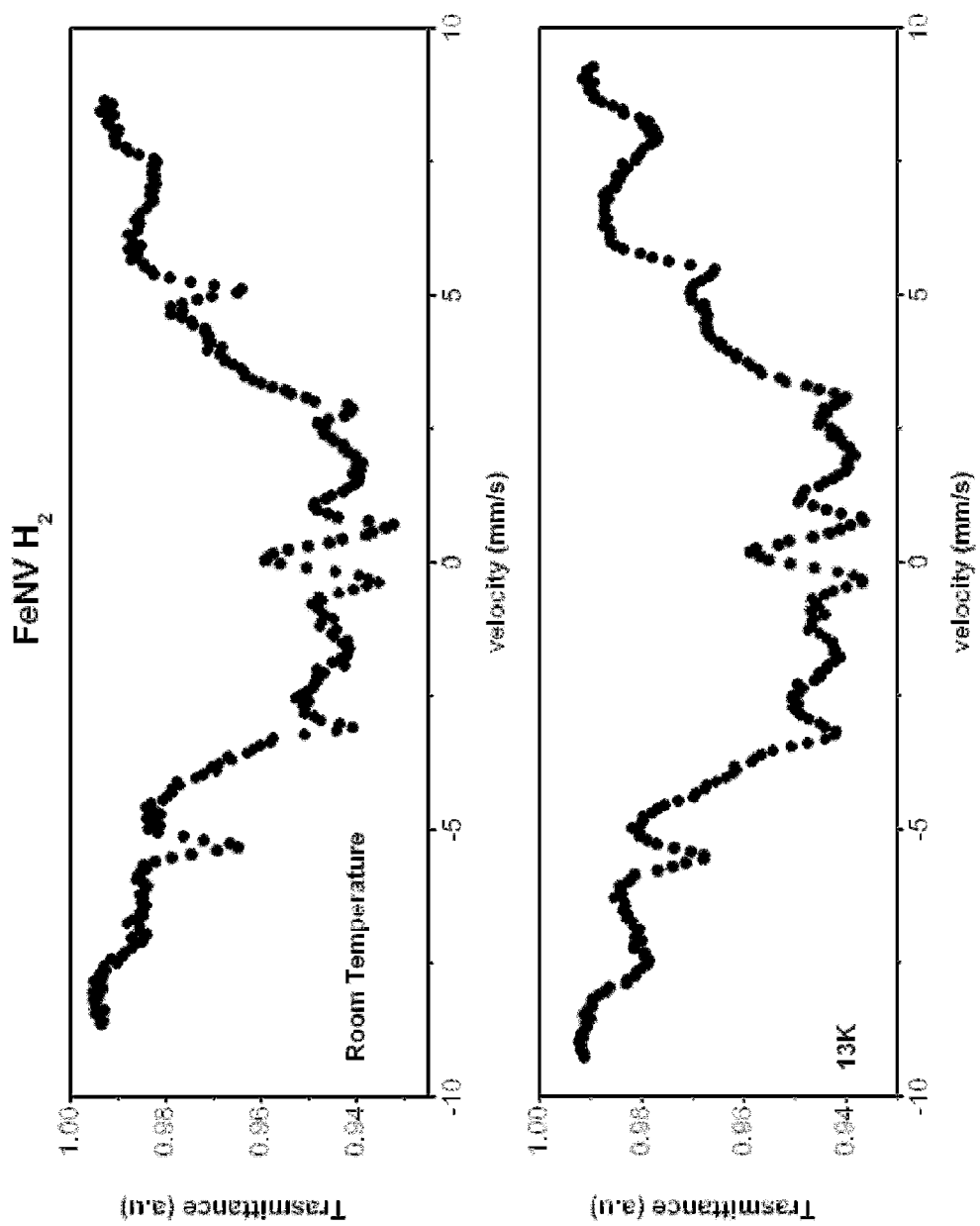
FIG. 1: the figure shows an example of a Mössbauer spectrum of iron-based composition of matter obtained at the step a) of the preparation method of the invention after separation and washings (product 1 in the figure reported as FeNV $H_2$). Zero-field Mössbauer spectrum was recorded at 298 (room temperature) and 13 K in a constant acceleration mode with a 50 mCi $^{57}Co(Rh)$ source. The values of the isomer shift are reported with respect to α-Fe at room temperature.

Unless otherwise defined, all technical and scientific terms used in the whole description of the present invention have the same meanings as said terms are commonly understood by one of ordinary skill in the art to which this invention pertains.

Therefore, as used herein, the words "nanoparticle(s)" have the above defined extended meaning.

With the method of the present invention Fe-based compositions of matter comprising Fe-based nanoparticles, where iron has different oxidation states, are obtained. Thus, for sake of clarity, the Fe-based nanoparticles obtained by said method at the step a), step b) and step c) and d), are herein identified referring to the most abundant Fe chemical oxidation state.

In detail, the iron-based composition of matter obtained at step a) comprises mainly nanoparticles at metallic state, i.e. with oxidation state 0 ($Fe^0$), and iron(III) ($Fe^{3+}$), as determined by Mössbauer spectroscopy. These nanoparticles are, therefore, herein indicated as ($Fe^0$)-containing nanoparticles or as "product 1".

As regards to iron-based composition of matter obtained at step b), and herein also coded as product 2, as determined by Mössbauer spectroscopy, it consists of only partly crystallized maghemite ($\gamma$-$Fe_2O_3$). Hence, for this product is herein used the definitions "black maghemite $Fe^{(3+)}$-based nanoparticles" or "black $Fe^{(3+)}$-based nanoparticles" or equivalent definitions or "product 2".

As regards to the red brown iron-based product obtained at the step c), herein also coded as product 3, as determined by Mössbauer spectroscopy it consists of stoichiometrically pure maghemite superparamagnetic nanoparticles characterized by the stoichiometric formula of $(Fe^{3+})^T (Fe^{3+}_{5/3} o_{1/3})^H O_4$, where "o" stands for vacancies, and T and H for tetrahedral and octahedral positioning. Therefore, for these nanoparticles the following definitions can herein used: "red-brown $Fe^{(3+)}$-based nanoparticles", "red-brown maghemite nanoparticles", "stoichiometric maghemite nanoparticles" or "stoichiometric maghemite ($\gamma$-$Fe_2O_3$) superparamagnetic nanoparticles or equivalent definitions or "product 3".

The term "nanocarrier(s)" has herein the meaning of "stoichiometric pure maghemite ($\gamma$-$Fe_2O_3$) superparamagnetic nanoparticles" further reversibly binding, without any surface modification, organic molecules and/or biomolecules capable to form with the maghemite nanoparticles coordination bonds. In particular, preferably organic molecules and/or biomolecules are selected from probes, most preferably fluorescent, nucleic acids, peptides, proteins, antibodies, enzymes. Thus for example, it is intended, but not limited to, one of the following meanings:

stoichiometrically pure maghemite ($\gamma$-$Fe_2O_3$) nanoparticles which can carry nucleic acids and in particular single or double strands of DNA or RNA;

stoichiometrically pure maghemite ($\gamma$-$Fe_2O_3$) nanoparticles which can carry an enzyme and then that can be used as enzyme carrier for magnetically driveable nanocatalysts;

stoichiometrically pure maghemite ($\gamma$-$Fe_2O_3$) nanoparticles which can carry fluorescent probes, such as for example rhodamine B isothiocyanate (but not fluorescein, fluorescein isothiocyanate, rhodamine 110), and thus can produce a fluorescent magnetically driveable, fluorescence detectable, carrier for other biomolecules to be specifically in-situ delivered, for example for DNA purification or for enzymes nanocarrier;

stoichiometrically pure maghemite ($\gamma$-$Fe_2O_3$) nanoparticles which can carry antibodies for the recognition and detection of macromolecular antigens, such as cancer antigens.

The term "suspension" indicates a heterogeneous fluid containing solid particles that are sufficiently large for sedimentation. The internal phase (solid) is dispersed throughout the external phase (fluid) through mechanical agitation. Unlike colloids, suspensions will eventually settle.

The term "colloid" indicates a chemical mixture in which one solid substance (dispersed phase) is dispersed evenly throughout a solvent (continuous phase).

The term "polydispersity index" represents the measure of the size distribution of nanoparticle samples. The polydispersity index (PDI) is calculated as the "weight average size" ($M_w$) divided by the "number average size" ($M_n$): PDI=$M_w$/$M_n$. Where the "weight average size" is defined as $M_w = (\Sigma_i N_i \cdot M_i^2)/(\Sigma_i N_i \cdot M_i)$ and "number average size" is $M_n = (\Sigma_i N_i \cdot M_i)/(\Sigma_i N_i)$.

DESCRIPTION

The present invention relates to a simple and low cost method of preparation of highly monodispersed iron superparamagnetic nanoparticles, consisting of purely stoichiometric maghemite ($\gamma$-$Fe_2O_3$), and characterized by the ability to form of stable colloid in water. These nanoparticles present the capability to interact and to bind to numerous organic and biological molecules without any surface modification of particle surface. The preparation procedure subject of the invention, as hereinbefore disclosed, is very simple, inexpensive and it does not require the use of polluting solvents as compared with other preparation methods described in literature, which are quite cumbersome, needing expensive reagents or instrumentations and large amount of organic solvents. Furthermore, methods already described in literature do not report on the possibility to prepare a stable nanoparticles suspension without nanoparticles surface modification, which increases synthetic complication. As regards commercially available iron nanoparticles, up to now, their dimensions are in micron range, rather than nanometers.

The present invention herein disclosed provides a novel chemical procedure to synthesize dimensionally homogeneous, stoichiometrically pure maghemite ($\gamma$-$Fe_2O_3$) superparamagnetic iron oxide nanoparticles, overcoming the properties of previously described maghemite-based nanomaterials.

Method of Preparation of Maghemite Nanoparticles

The method for preparing maghemite ($\gamma$-$Fe_2O_3$) superparamagnetic nanoparticles according to the invention is characterized by a step of reduction of $Fe^{3+}$ ions performed in appropriate conditions and essentially suitable to obtain a Fe-based material comprising ($Fe^0$)-containing nanoparticles, being this material the key intermediate for the achievement of the stoichiometrically pure maghemite $\gamma$-$Fe_2O_3$ superparamagnetic nanoparticles pursued. Actually, this material is very stable and further subject to treatments of aging or annealing can produce the Fe-based nanoparticles previously mentioned.

Therefore, in one embodiment the method for preparing maghemite ($\gamma$-$Fe_2O_3$) superparamagnetic nanoparticles, according to the invention, comprises the steps of:

a) reducing $Fe^{3+}$ ions by treating at room temperature aqueous solutions of $Fe^{3+}$ salts with an ammonia aqueous solution of sodium borohydride ($NaBH_4$) (pH range 7-9), and then heating the reaction mixture up to 100° C. and keeping the same at this temperature for a time comprised from 0.5 to 5.0 hours obtaining a composition of Fe-based material comprising ($Fe^0$)-containing nanoparticles (product 1);

b) oxidizing the composition of Fe-based material obtained in a) by aging under stirring at room temperature in an atmosphere consisting of air a water suspension of the said composition for a time comprised from 24 to 96 hours, leading to the oxidation of $Fe^{(0)}$-containing nanoparticles comprised in said composition to black maghemite $Fe^{(3+)}$-containing nanoparticles (product 2);

c) oxidizing the "black maghemite $Fe^{(3+)}$-containing nanoparticles" (product 2) by aging under stirring at room temperature a water suspension of the same for a time comprised from 24 to 96 hours, or by curing the "black maghemite $Fe^{(3+)}$-containing nanoparticles" (product 2) heating the same at temperatures comprised from 350 to 450° C. for a time comprised from 20 min to 2 hours, obtaining a composition of Fe-based material comprising red-brown stoichiometric maghemite ($\gamma$-$Fe_2O_3$) nanoparticles (product 3);

c) separating and washing the stoichiometrically pure maghemite $\gamma$-$Fe_2O_3$ superparamagnetic nanoparticles obtained in the previous step.

In detail, considering these essential steps and the optional steps of separation of the intermediate products obtained at step a) and b) the method is as hereunder described.

The first and the key step of the method according to the invention is the reduction step a) of $Fe^{(3+)}$ salts, where $Fe^{(3+)}$ salts are selected from chloride, sulphate, nitrate or perchlorate and mixtures thereof. The $Fe^{(3+)}$ salts are preferably ferric chlorides and the most preferred $Fe^{(3+)}$ salts for the reduction step a) is $FeCl_3 \cdot 6H_2O$.

Following the dissolution of the $Fe^{(3+)}$ salts in ultrapure water, $NaBH_4$ is added (1.3-1.6 mol $NaBH_4$/mol $Fe^{(3+)}$) in ammonia (4.5-5.0 mol $NH_3$/mol $Fe^{(3+)}$). After the reduction reaction occurrence the Fe-based material turned immediately to a black color. The temperature of the system was increased to 100° C. and kept constant for 0.5-5 hours and preferably for 2 hours, giving after separation and washings a product (product 1) characterized by high stability and that can be stored at room temperature, under dry conditions, for months, maintaining a strong magnetic behavior and containing $Fe^{(0)}$-nanoparticles as determined by Mössbauer spectroscopy. If this reduction is carried out at room temperature, the resulting product is unstable in air and tends to oxidize giving a non magnetic brown iron-based material within few hours.

Having magnetic properties the product 1 obtained at the step a) can be easily isolated by application of an external magnetic field and the isolated material can be washed extensively with distilled water. The material consisting of $Fe^{(0)}$-containing nanoparticles can be stored under dry conditions.

Then, the product 1, or the iron-based composition of matter comprising the same, can be aged, for the oxidation of the iron contained in the material, for 24-96 hours (and preferably 48 hours) in water at room temperature, giving a composition consisting of stable black $Fe^{(3+)}$-based nanoparticles (product 2). Optionally, this aged oxidized black product can be separated by imposition of an external magnet. The colorless supernatant (containing salts) can be discarded. The nanoparticles were washed several times with water. The black $Fe^{(3+)}$-based nanoparticles, obtained after the first aging as such, or isolated as previously described, can be transformed into a red-brown nanoparticle system called "product 3" by a second treatment of ageing in water at room temperature for a time comprised from 24 to 96 hours (and preferably for 48 hours). Alternatively, product 3 can be produced by drying and curing "product 2" preferably at 400° C. for 20 min-2 hours. Having magnetic properties said product 3, is separated as previously described for product 1 and stored for the uses hereinabove foreseen. If the aging is selected as processes suitable for the oxidation(s) of the Fe-based compositions in the preparation process of the stoichiometrically pure maghemite, the steps a) and b) can be re-joined in one single step having a length of time from 3 to five 5 days (and preferably for 4 days).

This synthesis process is the preferred and a further embodiment of the invention, being the less-time consuming, while the method, where two steps of oxidation are performed, is used in case of separation of the intermediate, product 2, is pursued. Therefore, keeping the same operational conditions previously mentioned, in a yet further embodiment the method of preparation of maghemite γ-Fe$_2$O$_3$ superparamagnetic nanoparticles comprises:
 a) reducing Fe$^{(3+)}$ ions obtaining a composition of Fe-based material comprising (Fe$^0$)-containing nanoparticles (product 1);
 b) separating and washing the Fe-based material comprising (Fe$^0$)-containing nanoparticles (product 1) obtained;
 c) oxidizing the Fe$^{(0)}$-containing nanoparticles obtained in b) leading to black maghemite Fe$^{(3+)}$-based nanoparticles (product 2);
 d) separating and washing the black maghemite Fe$^{(3+)}$-based (product 2) nanoparticles obtained;
 e) oxidizing the black Fe$^{(3+)}$-based nanoparticles obtaining an iron-based composition comprising red-brown maghemite (γ-Fe$_2$O$_3$) nanoparticles (product 3);
 f) separating and washing the stoichiometrically pure maghemite (γ-Fe$_2$O$_3$) superparamagnetic nanoparticles obtained in the previous step.

Furthermore, in a most preferred embodiment the method of preparation of maghemite γ-Fe$_2$O$_3$ superparamagnetic nanoparticles comprises:
 a) reducing Fe$^{(3+)}$ ions obtaining a composition of Fe-based material comprising (Fe$^0$)-containing nanoparticles (product 1);
 b) oxidizing the Fe$^{(0)}$-containing nanoparticles obtained in b) leading to the oxidation of Fe$^{(0)}$-containing nanoparticles to red-brown maghemite Fe$^{(3+)}$-based nanoparticles (product 3);
 c) separating and washing the stoichiometric maghemite (γ-Fe$_2$O$_3$) superparamagnetic nanoparticles obtained in the previous step.

Characterization of the Fe-Based Nanoparticles Obtained at the Different Steps of the Method of the Invention The iron-based products obtained at the different steps of the preparation as previously described (i.e. product 1, 2 and 3) have been characterized by means of well-established methodologies, such as transmission electron microscopy, X-ray powder diffraction (XRD) and Mössbauer spectroscopy and the results obtained are briefly discussed hereunder with reference to the figures herein annexed.

Figure 2:
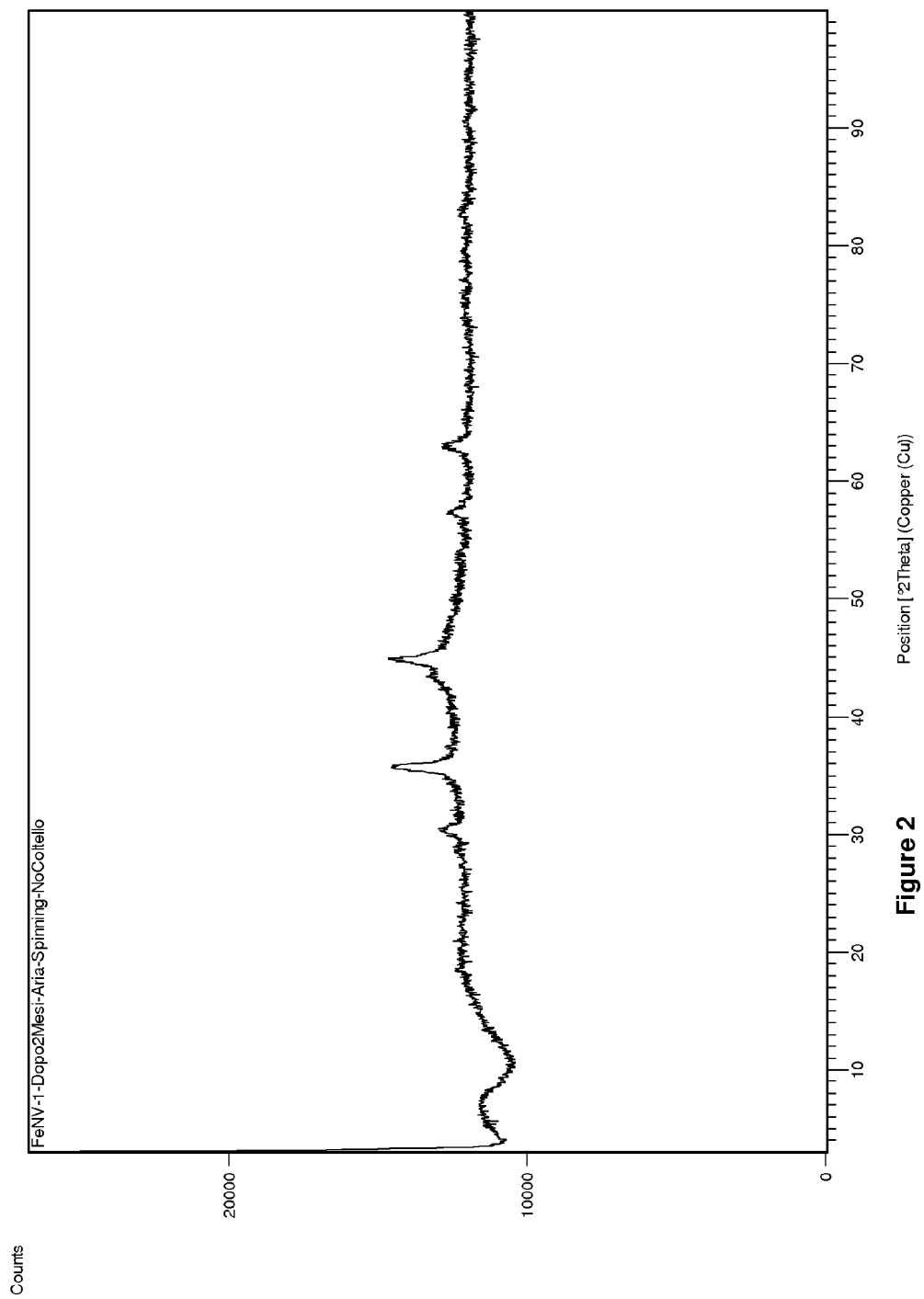
FIG. 2: the figure shows X-ray powder diffraction (XRD) experiment carried out on iron-based composition of matter obtained at the step a) of the preparation method of the invention after separation and washings (product 1). Experiment was performed with a PANalytical X'Pert PRO instrument (CoKa radiation) equipped with an X'Celerator detector. Samples were spread on a zero-background Si slides and step-scanned in the 2θ range of 10-100° in steps of 0.017° for 720 s per step.

Product 1: According to Mössbauer spectrum acquired at room temperature (FIG. 1) this material resulted to contain substantially Fe$^{(0)}$ and alloys thereof and a residue of Fe$^{(3+)}$-based material. This product 1 responds to an externally applied magnetic field. X-ray powder diffraction analysis showed that the Fe$^{(0)}$ containing material presents low cristallinity (FIG. 2). The peak list of the diffractogram showed in FIG. 2 is hereunder reported in table 1:

TABLE 1

| Position [°2Th.] | Height (counts) | FWHMLeft (°2Theta) | d-spacing (Å) | Relative intensity Int. (%) |
|---|---|---|---|---|
| 18.416230 | 3402.453000 | 0.389664 | 4.81772 | 25.56 |
| 23.724630 | 1701.102000 | 0.779328 | 3.75041 | 12.78 |
| 30.163310 | 3641.852000 | 0.454608 | 2.96292 | 27.36 |
| 35.746400 | 11552.84000 | 0.292248 | 2.51192 | 86.80 |
| 43.258260 | 6536.125000 | 0.389664 | 2.09154 | 49.11 |
| 44.929340 | 13310.39000 | 0.129888 | 2.01756 | 100.00 |
| 53.524310 | 1353.820000 | 0.649440 | 1.71210 | 10.17 |
| 57.226860 | 2929.332000 | 0.259776 | 1.60982 | 22.01 |
| 62.825700 | 4018.063000 | 0.584496 | 1.47915 | 30.19 |
| 65.076000 | 702.0669000 | 0.090000 | 1.43334 | 5.27 |
| 71.445000 | 854.8746000 | 0.090000 | 1.32041 | 6.42 |
| 74.415000 | 1352.768000 | 0.090000 | 1.27490 | 10.16 |
| 82.779640 | 2077.715000 | 0.649440 | 1.16600 | 15.61 |
| 90.189000 | 1011.127000 | 0.090000 | 1.08848 | 7.60 |

Figure 3:
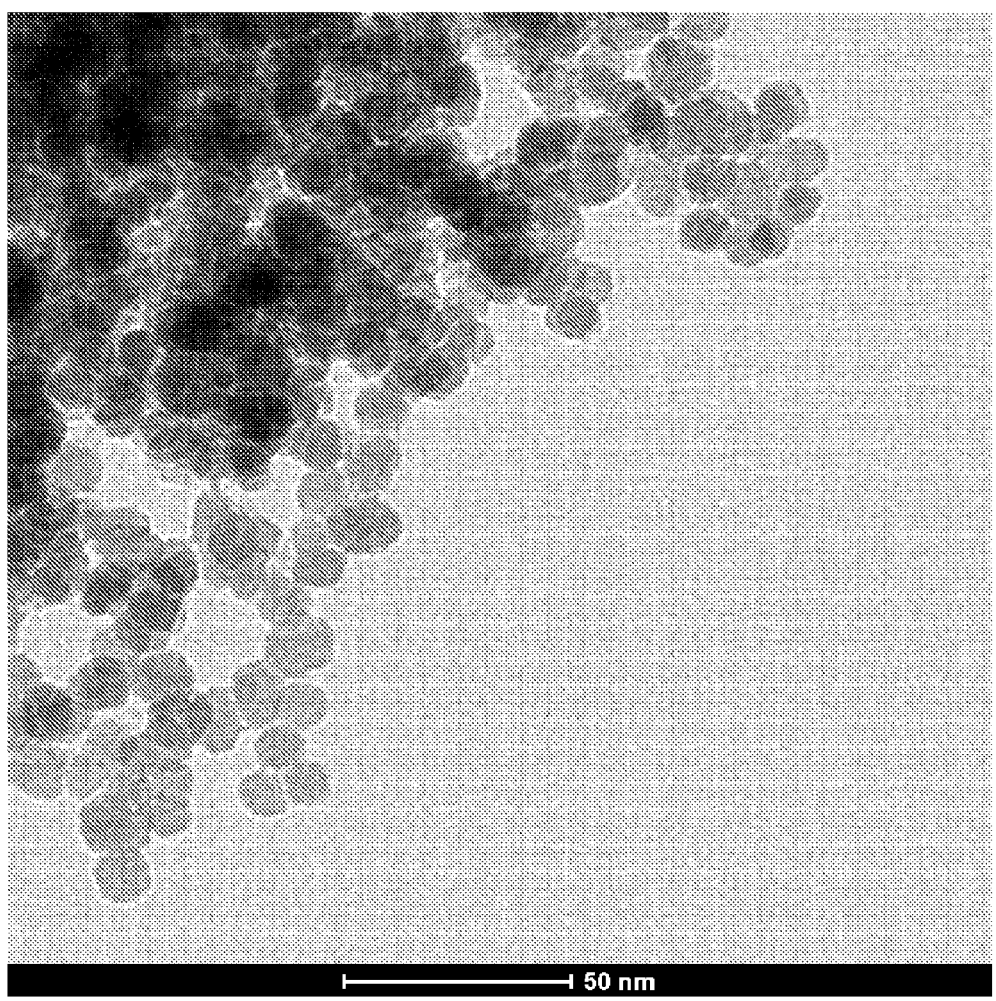
FIG. 3: the figure shows an example of a representative transmission electron microscopy (TEM) image of black maghemite superparamagnetic nanoparticles prepared at the step b) according to the method of the invention after separation and washings coded as product 2.
Figure 4:
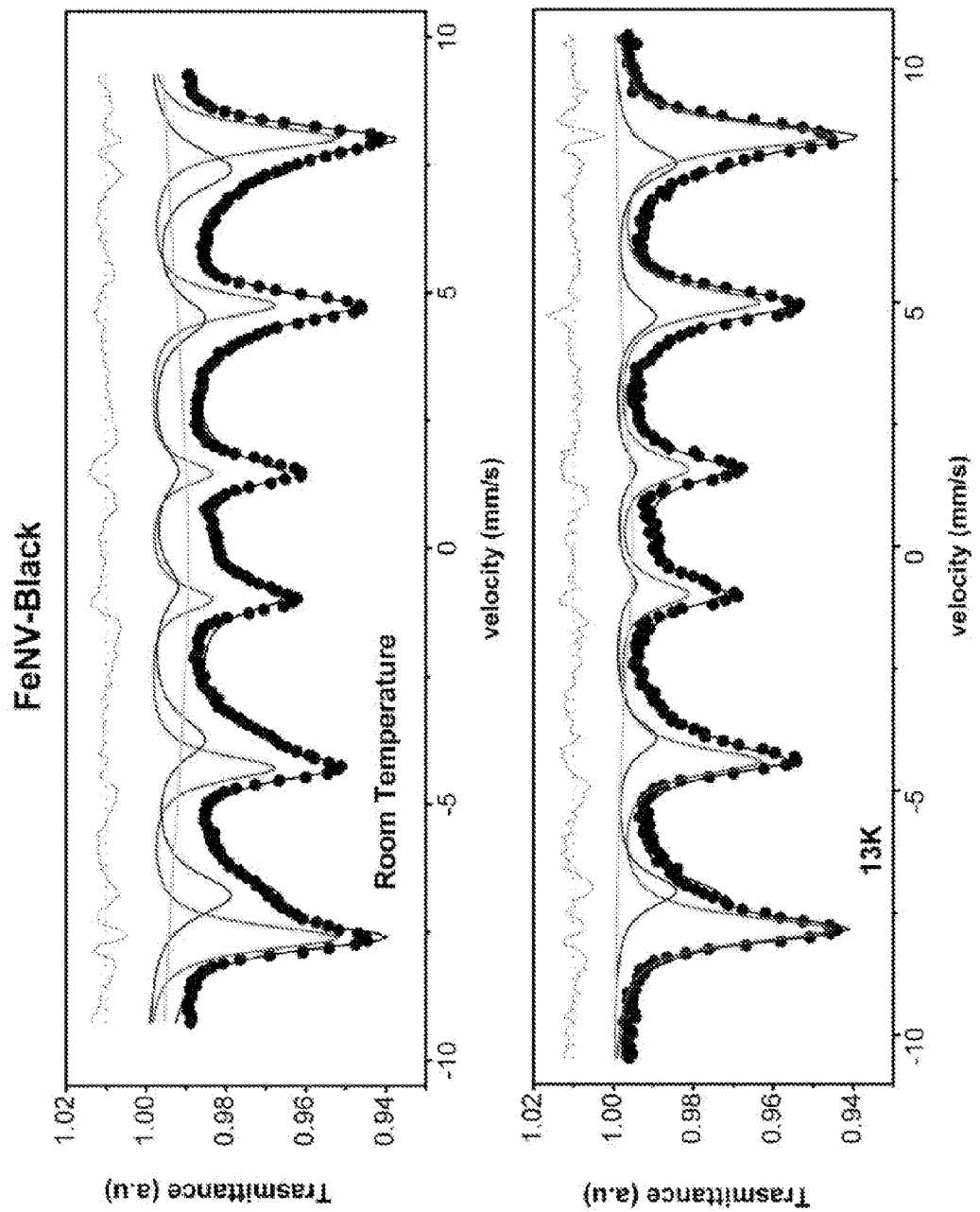
FIG. 4: the figure shows an example of a Mössbauer spectrum of iron oxide nanoparticles coded as product 2 (in the figure reported as FeNV-Black). Zero-field Mössbauer spectrum was recorded at 298 (room temperature) and 13 K in a constant acceleration mode with a 50 mCi $^{57}Co(Rh)$ source. The values of the isomer shift are reported with respect to α-Fe at room temperature.
Figure 5:
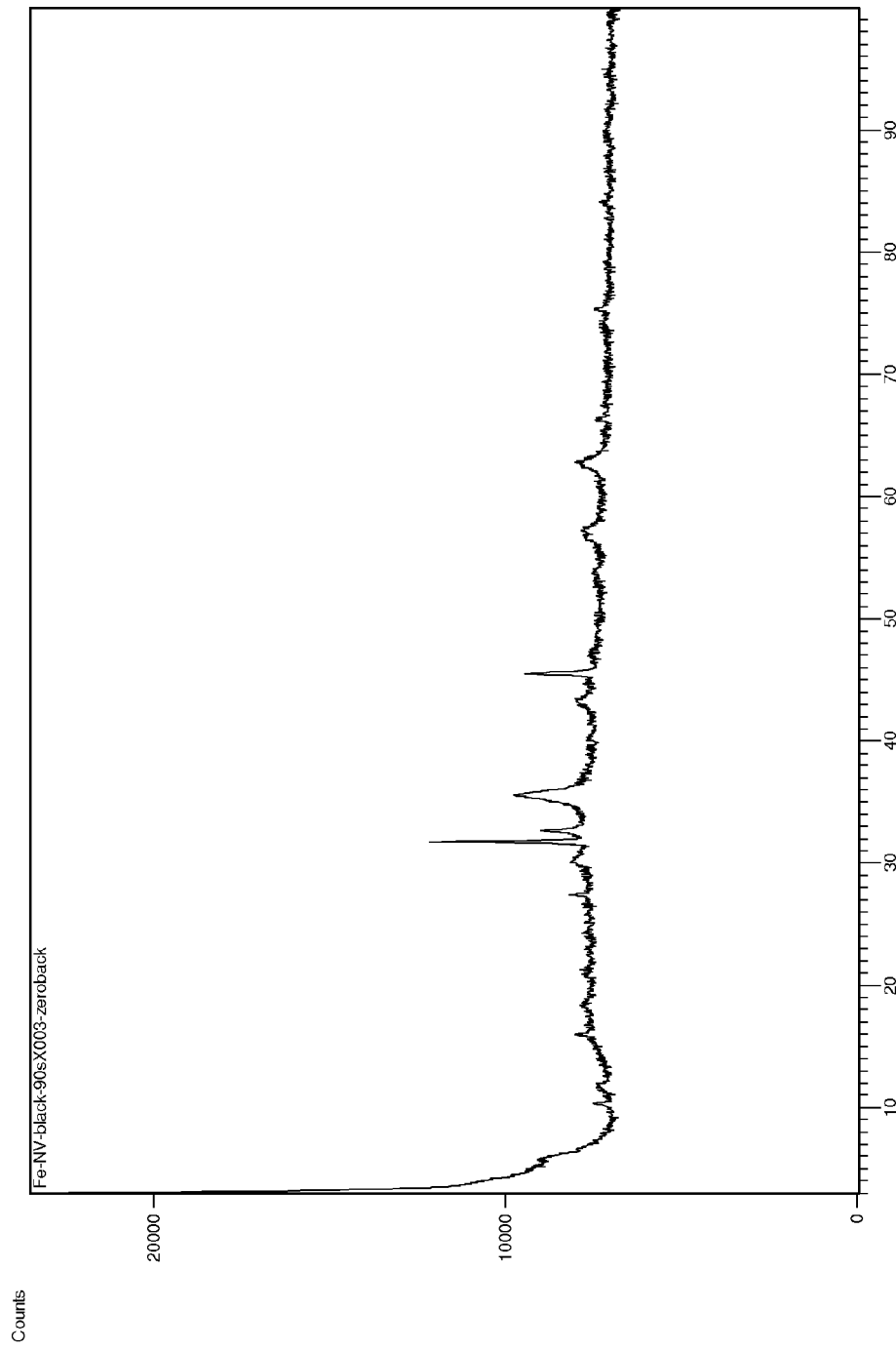
FIG. 5: the figure shows X-ray powder diffraction (XRD) experiment carried out on iron oxide nanoparticles coded as product 2. Experiment was performed with a PANalytical X'Pert PRO instrument (CoKa radiation) equipped with an X'Celerator detector. Samples were spread on a zero-background Si slides and step-scanned in the 2θ range of 10-100° in steps of 0.017° for 720 s per step.

Product 2: this product was characterized by transmission electron microscopy (TEM) showing nanoparticles characterized by a mean size from 10 to 12 nm (FIG. 3). Mössbauer spectroscopy (FIG. 4) and X-ray powder diffraction analysis (FIG. 5) indicate that Product 2 resulted to be constituted of maghemite nanoparticles characterized by low cristallinity.

Product 3: it was characterized by electron transmission microscopy, by infrared and Mössbauer spectroscopy, by X-ray diffraction and magnetization measurements.

Figure 6:
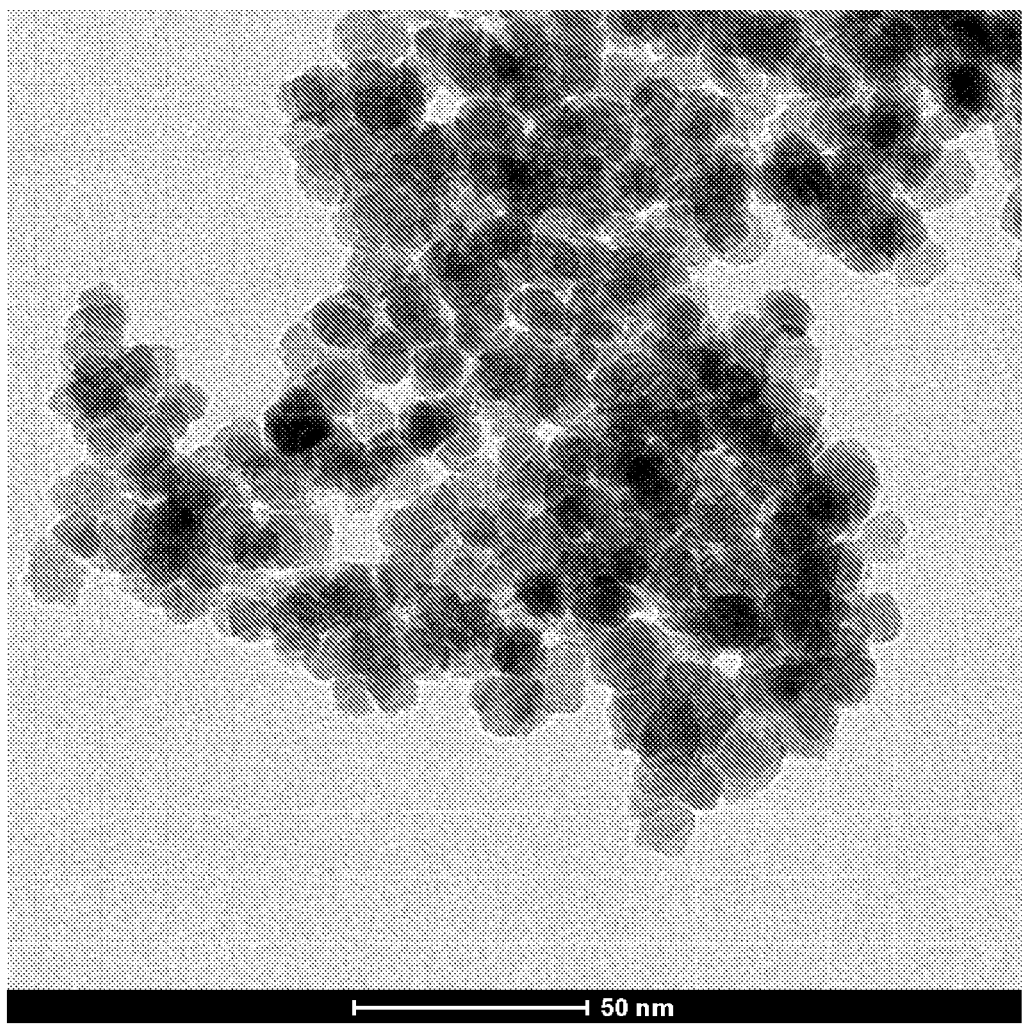
FIG. 6: the figure shows an example of a representative transmission electron microscopy (TEM) image of red-brown maghemite superparamagnetic nanoparticles, prepared at the steps d) according to the method of the invention, coded as product 3.
Figure 7:
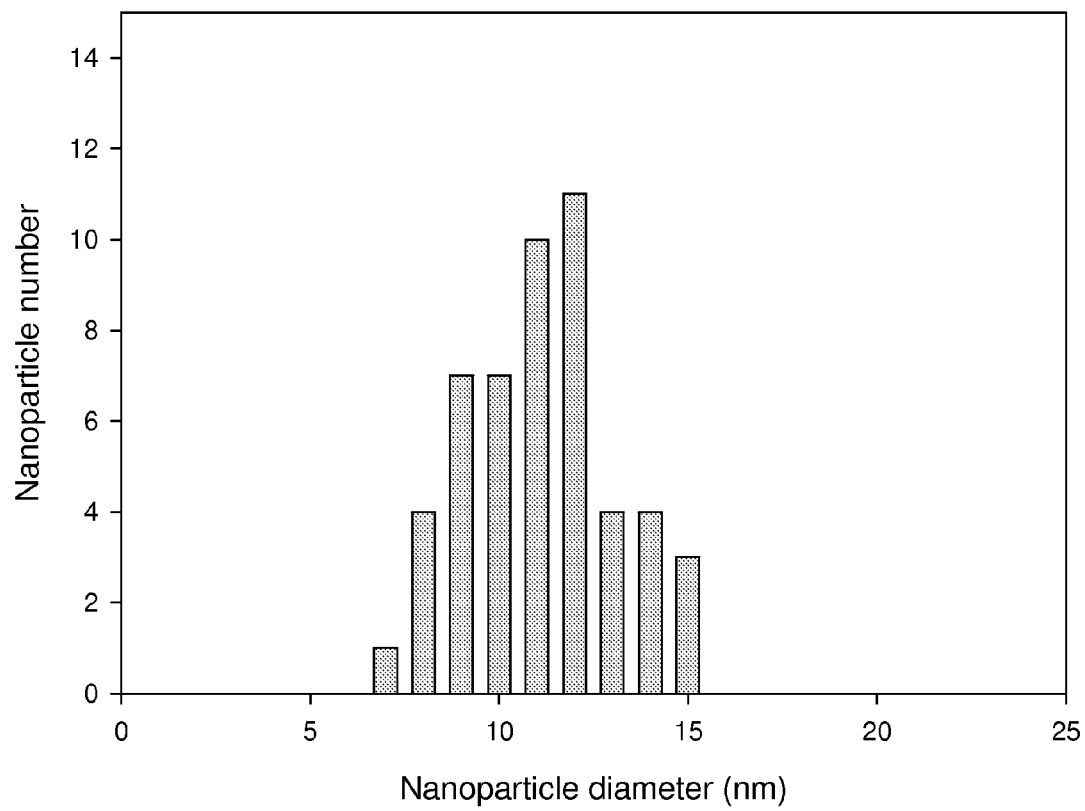
FIG. 7: the figure shows an example of a representative dimensional distribution of product 3, as determined by transmission electron microscopy (TEM) image analysis.
Figure 8:
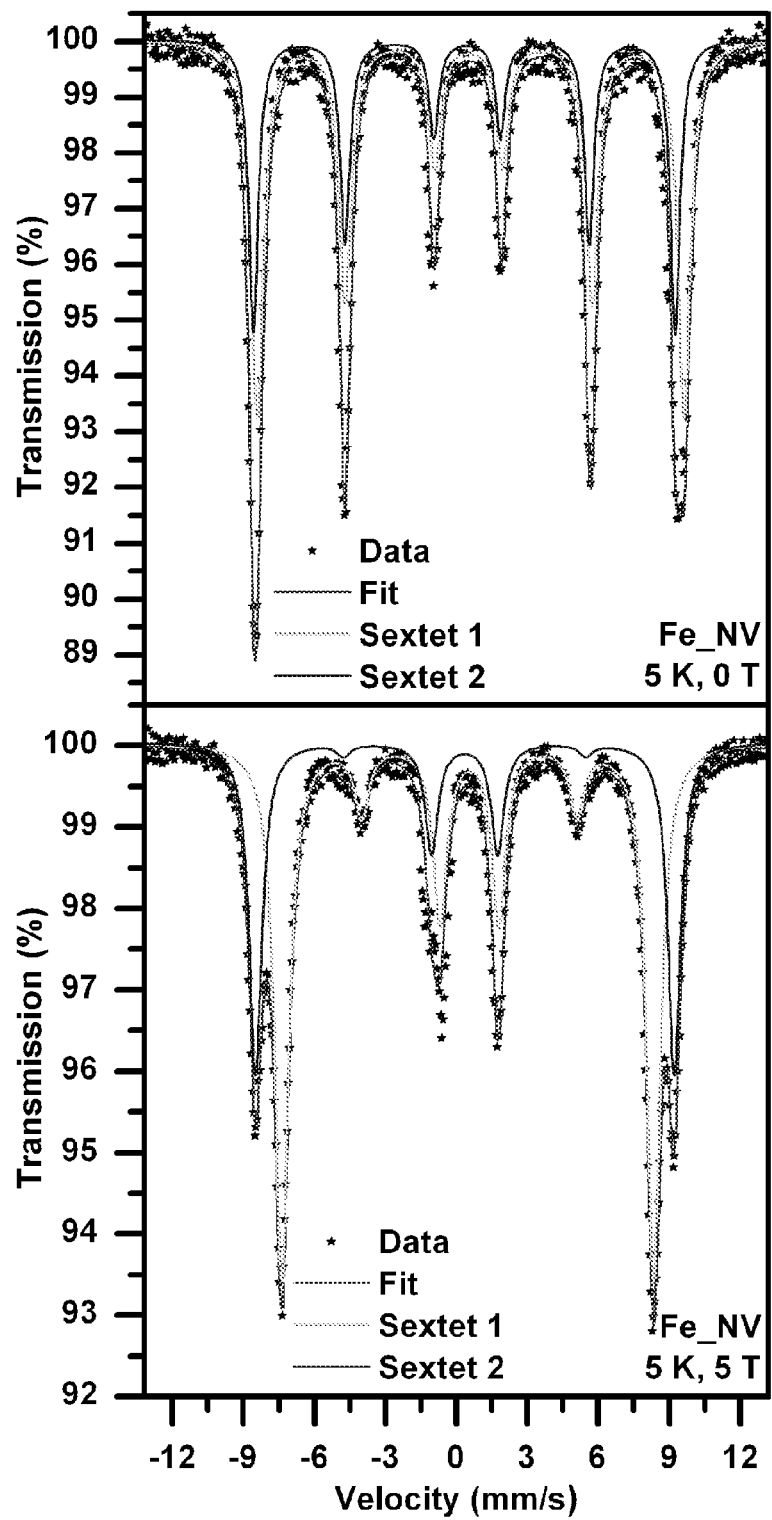
FIG. 8: the figure shows X-ray powder diffraction (XRD) experiment carried out on iron oxide nanoparticles coded as product 3 (in the figure reported as Fe_NV). Experiment was performed with a PANalytical X'Pert PRO instrument (CoKα radiation) equipped with an X'Celerator detector. Samples were spread on a zero-background Si slides and step-scanned in the 2θ range of 10-100° in steps of 0.017° for 720 s per step.

The FIG. 6 represents a transmission electron microscopy (TEM) of the product obtained at the end of the synthesis process object of the invention and the dimensional distribution of product 3 is reported in FIG. 7, where a distribution of the size of said nanoparticles between 7 to 15 nm is shown. Furthermore, product 3 was characterized by X-ray powder diffraction and by Mössbauer spectroscopy. The X-ray powder diffraction is reported in FIG. 8 and the peak list of the diffractogram showed in FIG. 8 is hereunder reported in table 2:

TABLE 2

| Position (°2Theta) | Height (counts) | FWHMLeft (°2Theta) | d-spacing (Å) | Relative intensity (%) |
|---|---|---|---|---|
| 18.416460 | 1763.243000 | 0.382616 | 4.81368 | 5.87 |
| 18.429860 | 1583.721000 | 0.461266 | 4.81021 | 5.27 |
| 26.166680 | 1511.923000 | 0.472391 | 3.40286 | 5.03 |
| 30.292700 | 8341.333000 | 0.390781 | 2.94811 | 27.78 |
| 30.326260 | 9810.363000 | 0.480046 | 2.94493 | 32.67 |
| 30.369760 | 4147.272000 | 0.390848 | 2.94811 | 13.81 |
| 30.369760 | 2301.814000 | 0.480132 | 2.94811 | 7.66 |
| 30.403410 | 4876.945000 | 0.480199 | 2.94493 | 16.24 |
| 35.681900 | 30031.59000 | 0.395960 | 2.51423 | 100.00 |
| 35.689160 | 29585.56000 | 0.491702 | 2.51374 | 98.51 |
| 35.747180 | 13429.13000 | 0.491839 | 2.50979 | 44.72 |
| 35.773540 | 14928.02000 | 0.396056 | 2.51423 | 49.71 |
| 35.780810 | 14703.39000 | 0.491919 | 2.51374 | 48.96 |
| 35.839000 | 6673.969000 | 0.492057 | 2.50979 | 22.22 |
| 37.325460 | 2231.193000 | 0.397736 | 2.40721 | 7.43 |
| 37.353380 | 1749.323000 | 0.495740 | 2.40547 | 5.82 |
| 43.368640 | 6208.777000 | 0.405106 | 2.08475 | 20.67 |
| 43.467210 | 2469.025000 | 0.512353 | 2.08025 | 8.22 |
| 43.481870 | 3085.094000 | 0.405257 | 2.08475 | 10.27 |
| 53.811250 | 2587.297000 | 0.421270 | 1.70223 | 8.62 |
| 53.832230 | 3079.752000 | 0.547345 | 1.70162 | 10.26 |
| 53.895140 | 1547.382000 | 0.547585 | 1.69978 | 5.15 |
| 53.976810 | 1528.958000 | 0.547898 | 1.70162 | 5.09 |
| 57.366760 | 5926.141000 | 0.427888 | 1.60489 | 19.73 |
| 57.371790 | 6110.586000 | 0.561436 | 1.60476 | 20.35 |
| 57.412000 | 2123.650000 | 0.561603 | 1.60374 | 7.07 |
| 57.492350 | 3112.374000 | 0.561937 | 1.60169 | 10.36 |
| 57.522580 | 2942.866000 | 0.428193 | 1.60489 | 9.80 |
| 57.527620 | 3033.121000 | 0.562084 | 1.60476 | 10.10 |

TABLE 2-continued

| Position (°2Theta) | Height (counts) | FWHMLeft (°2Theta) | d-spacing (Å) | Relative intensity (%) |
|---|---|---|---|---|
| 57.648580 | 1544.886000 | 0.562588 | 1.60169 | 5.14 |
| 63.002770 | 11185.92000 | 0.439698 | 1.47420 | 37.25 |
| 63.078770 | 10158.09000 | 0.586694 | 1.47261 | 33.82 |
| 63.177330 | 5554.150000 | 0.440091 | 1.47420 | 18.49 |
| 63.253590 | 5041.223000 | 0.587520 | 1.47261 | 16.79 |
| 74.557930 | 2121.942000 | 0.469823 | 1.27176 | 7.07 |
| 74.597440 | 1923.467000 | 0.648531 | 1.27118 | 6.40 |
| 90.385200 | 2112.687000 | 0.528270 | 1.08572 | 7.03 |

Figure 9:
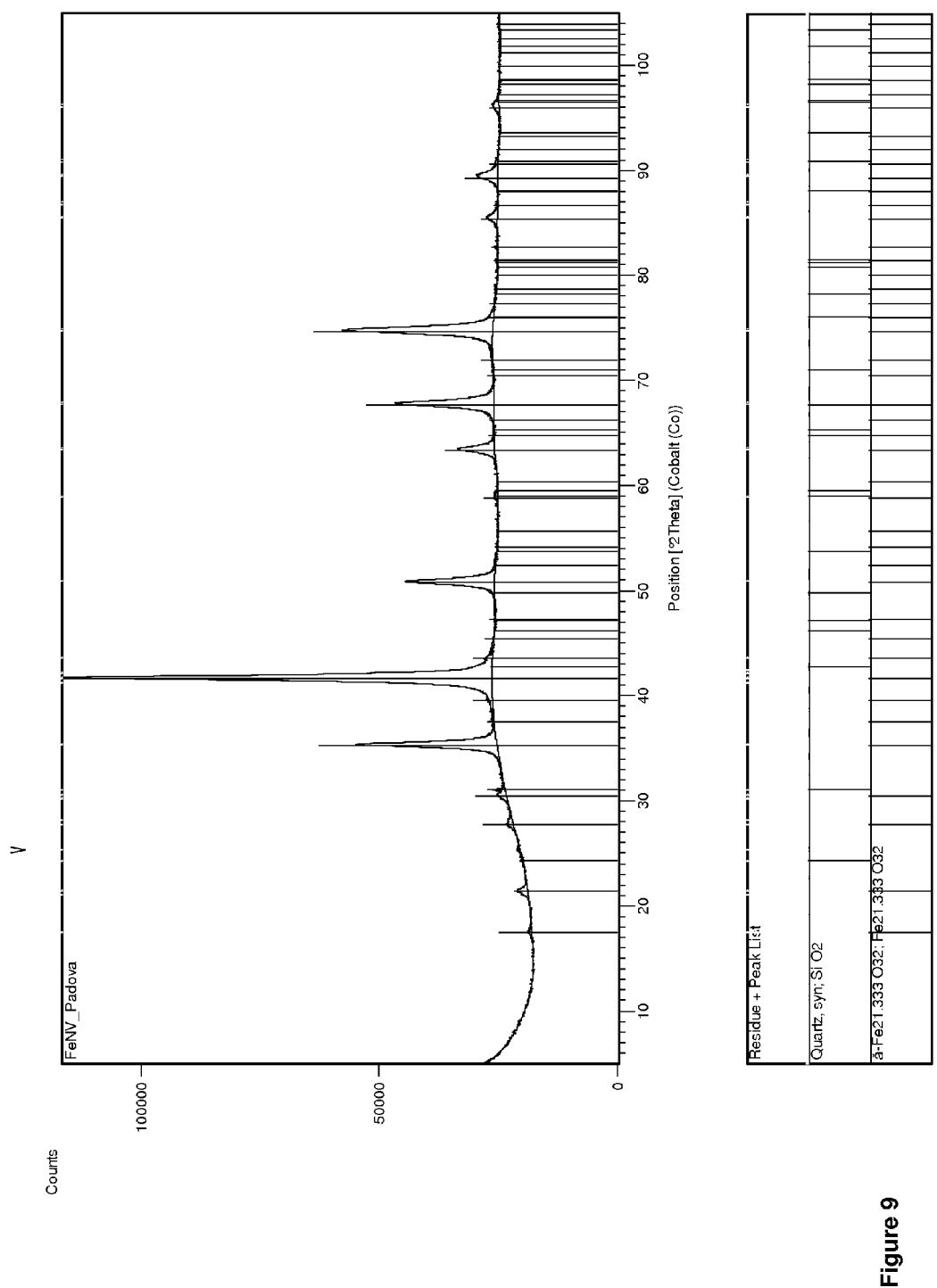
FIG. 9: the figure shows an example of a Mössbauer spectrum of iron oxide nanoparticles coded as product 3. Zero-field and in-field (5 T) Mössbauer spectrum was recorded at 5 K in a constant acceleration mode with a 50 mCi $^{57}Co(Rh)$ source. The values of the isomer shift are reported with respect to α-Fe at room temperature.

The characterization by Mössbauer spectroscopy was performed in the temperature range 5-300 K and the representative Mössbauer spectra are reported in FIG. 9. The Mössbauer spectrum, acquired at 5 K and in a field of 5 T, is composed of two sextet components, differing in the hyperfine parameters (i.e. the values of the effective hyperfine magnetic field and isomer shift). The Mössbauer hyperfine parameters of both sextets, derived from the in-field Mössbauer spectrum at 5 K, corresponds to the parameters reported for maghemite, when the sextet 1 is ascribed to the $Fe^{3+}$ ions in a high spin state configuration (i.e. S=5/2) occupying the octahedral sites of the crystallographic structure whereas the sextet 2 arises from the $Fe^{3+}$ ions in a high spin state configuration situated on the tetrahedral sites of the maghemite spinel structure. The ratio of the spectral area of the octrahedral sextet to the spectral area of the tetrahedral sextet is equal to 5:3, which perfectly reflects the occupation of individual sites by the $Fe^{3+}$ ions, satisfying the stoichiometric formula of $(Fe^{3+})^T (Fe^{3+}_{5/3}\ o_{1/3})^O O_4$, where "o" stands for vacancies. In order words, as showed also by the X-ray powder diffraction pattern (FIG. 8), the prepared maghemite is purely stoichiometric.

The summary of Mössbauer results obtained on the three products are hereinabove reported in table 3.

TABLE 3

| Sample | IS | QS | H | LW | A (%) | attribution |
|---|---|---|---|---|---|---|
| Product 1 | 0.02 | −0.01 | 32.30 | 0.27 | 6 | Fe(0) |
| | 0.45 | −0.10 | 42.60 | 1.56 | 18 | Maghemite |
| | 0.21 | −0.09 | 16.10 | 2.33 | 74 | Fe(0) |
| | 0.24 | 0.99 | — | 0.24 | 2 | Fe(0) |
| Product 2 | 0.33 | −0.00 | 49.20 | 0.59 | 60 | Maghemite |
| | 0.36 | −0.02 | 45.00 | 0.97 | 40 | Fe(III) |
| Product 3 | 0.33 | −0.04 | 47.53 | 0.62 | 41 | Fe(III) |
| | 0.37 | −0.10 | 42.13 | 1.49 | 32 | Maghemite |
| | 0.35 | 0.68 | — | 0.71 | 27 | |

Zero-field Mössbauer spectrum was recorded at 298K in a constant acceleration mode with a 50 mCi $^{57}Co(Rh)$ source.
IS: isomer shift, reported with respect to α-Fe at room temperature.
QS: quadrupole splitting;
H: hyperfine splitting;
LW: peak linewidth;
A (%): peak area.

Figure 10:
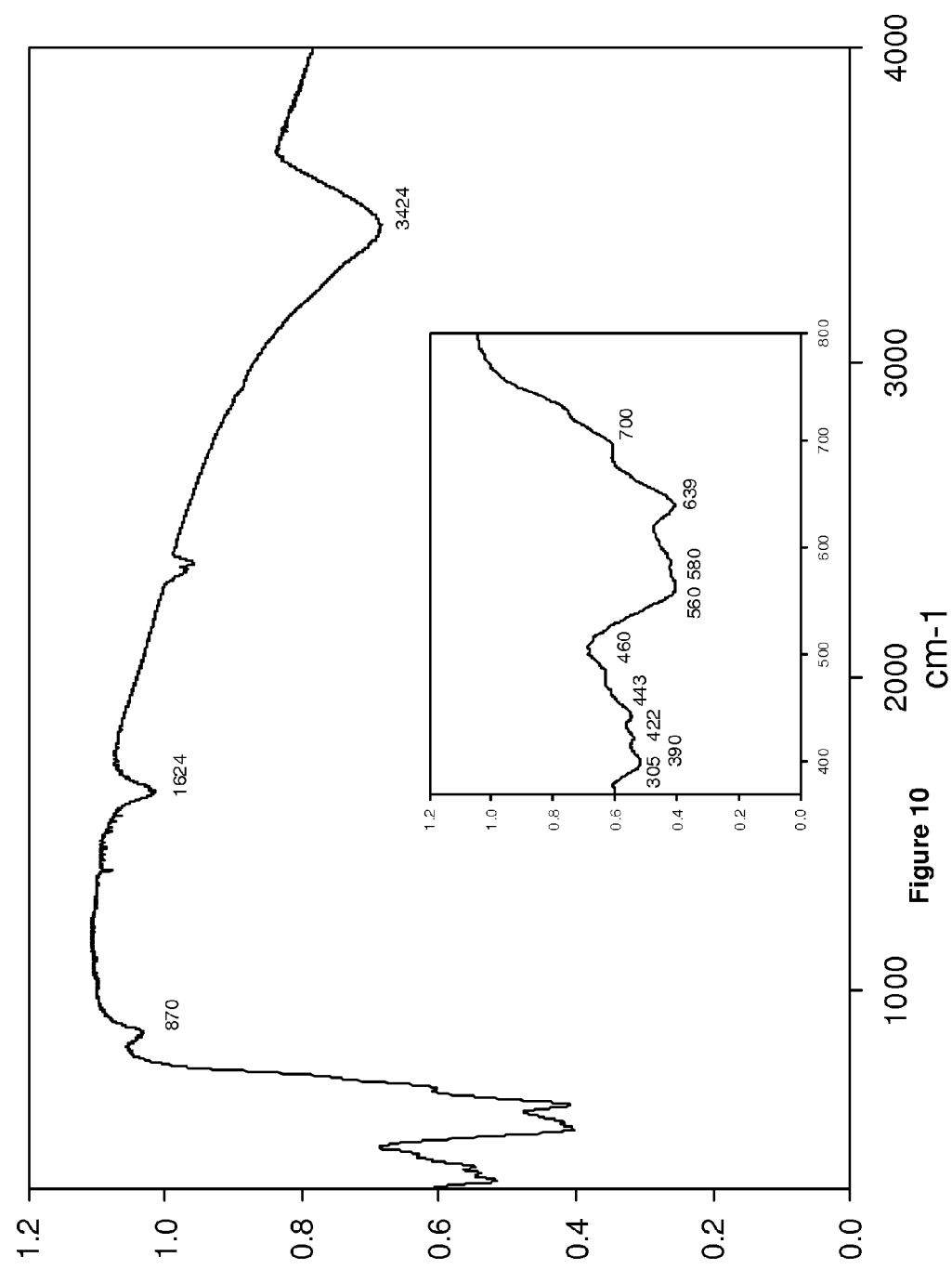
FIG. 10: the figure shows an example of a FTIR spectrum acquired in region 400-800 $cm^{-1}$, in KBr of iron oxide nanoparticles coded as product 3.

In FIG. 10 is presented the FTIR spectrum acquired in region 400-800 cm$^{-1}$, of product 3 pelletted in KBr, showing the characteristics IR bands of maghemite. Infrared spectra of these stoichiometric maghemite nanoparticles, acquired in region 400-800 cm$^{-1}$, showed the characteristic features of maghemite (at 445 and 630 cm$^{-1}$) indicating cation vacancies (Roca, A. G. et al., 2007, *J. Phys. Chem.* 111, 18577-18584; Daou, T. J. et al., 2008, *Chem. Mater.* 20, 5869-5875).

The main characteristics of the iron nanoparticles obtained with the method according to the invention are summarized in the following table 4.

TABLE 4

| Sample | Composition | Mössbauer spectroscopy | Crystallinity (x-ray diffraction) |
|---|---|---|---|
| Product 1 | Fe-based composition of matter comprising amorphous $Fe^{(0)}$ | substantially $Fe^{(0)}$ and alloys thereof and a residue of $Fe^{(3+)}$-based material | Amorphous |
| Product 2 | Fe-based composition of matter consisting of black $Fe^{(3+)}$-based nanoparticles | maghemite nanoparticles | Low crystallinity |
| Product 3 | Fe-based composition of matter consisting of red-brown $Fe^{(3+)}$-based nanoparticles | Stoichiometrically pure maghemite nanoparticles. | Highly crystalline |

As for the magnetization measurements, a summary of the results obtained by SQUID (Superconducting Quantum Interference Device) measurements on magnetization on product 3 are reported in table 7. Isothermal magnetization curve, acquired at 2 K, shows hysteresis with hysteresis parameters (i.e. coercivity and remnant magnetization) characteristic for bulk maghemite. The value of the maximum magnetization at 7 T is slightly lower than that reported for bulk maghemite, which is caused by a nanometer size of the particles (Fiorani, D., et al. 2002, *Physica B*, 320, 122-126).

TABLE 7

| Sample | T (K) | $M_{max+}$ (7 T) (emu/g) | $M_{max-}$ (7 T) (emu/g) | $H_{C+}$ (Oe) | $H_{C-}$ (Oe) | $M_{R+}$ (emu/g) | $M_{R-}$ (emu/g) |
|---|---|---|---|---|---|---|---|
| Product 3 | 2 | 77.0685 | −77.0685 | 220 | −227 | 20.6921 | −21.0906 |
| | 300 | 71.3944 | −71.3944 | 25 | −25 | 3.0324 | −3.2147 |

Parameters of the hysteresis loops of iron nanoparticles, measured at a temperature of 2K and 300K, where $M_{max+}$ (7 T) is a maximum magnetization at 7 T, $M_{max-}$ (7 T) is a maximum magnetization at −7 T, $H_{C+}$ is a positive coercivity, $H_{C-}$ is negative coercivity, $M_{R+}$ is a positive remnant magnetization and $M_{R-}$ is a negative remaining magnetization.

The stoichiometric maghemite ($\gamma$-$Fe_2O_3$) superparamagnetic nanoparticles of the invention can be superficially derivatised by simple incubation in water, in the pH range 2-10, in the presence of the selected molecule. Depending on the concentration of the nanoparticles and the selected molecules, binding process goes to completion within few tenths of minutes (30-180 minutes). By this way these stoichiometric maghemite nanoparticles can bind organic and/or biomolecules such as DNA, proteins (albumins, peroxidases) and fluorophores (rhodamine isothiocyanate). In the case of biomolecules which cannot directly and spontaneously bind to said nanoparticles, rhodamine isothiocyanate can be used as a spacer-arm, presenting the isothiocyanate functionality to which primary amino groups of the selected molecule can be covalently linked.

It is possible to functionalize nanoparticles surface with a low amount of rhodamine B isothiocyanate in order to guarantee a measurable fluorescent particle or to cover nanoparticle completely. In the first case nanoparticle surface can bind other macromolecules, such as DNA and enzymes, by their peculiar surface chemical properties. While, in the second case, isothiocyanate group of rhodamine B isothiocyanate can lead to the formation of covalent bonds with other substances (e.g. antibodies). By this way in both cases, a magnetically driveable, fluorescent, nanocarrier can be prepared with an easy cost-effective reaction. A typical example of the functionalisation procedure is described as follows:

The stoichiometrically pure maghemite nanoparticles of the invention (product 3) is suspended in MilliQ grade water at a concentration 10-200 mg/L by treatment in an ultrasonic bath at 48 kHz, 50 W, for at least 3 hour. As an example, a solution of 200 mg/L of nanoparticles binds 800 nM rhodamine isothiocyanate following the incubation in the presence of 10 µM rhodamine for 1 hour at room temperature. Alternatively, nanoparticles bind 30 µM rhodamine isothiocyanate following the incubation in the presence of 300 µM rhodamine for 3 hours.

If necessary, the bound molecule can be easily detached and released in the medium, by changing solution characteristics. In particular bound molecules can be released in the presence of ammonia (0.5 M $NH_3$ in water) or in 96% ethanol. Depending on the nature of the biomolecule, these stoichiometrically pure maghemite nanoparticles can be used as nanocarrier for:

DNA and RNA binding: the stoichiometrically pure maghemite nanoparticles can be used as purification system for nucleic acids (DNA and RNA) from biological samples and easily detached for subsequent sequencing or analysis. Furthermore, exploiting cell endocytotic process, said nanoparticles carrying bound DNA can be used as magnetically addressable transfection vector;

protein binding: the stoichiometrically pure maghemite superparamagnetic nanoparticles can be used to purify and/or concentrate proteins from biological solutions for subsequent analysis;

enzyme binding: the stoichiometrically pure maghemite nanoparticles can be used for the preparation of magnetically recoverable nanocatalysts.

As for the application of the stoichiometrically pure maghemite nanoparticles of the invention for binding protein from biological samples and for their subsequent purification and analysis, it is particularly interesting for the enology industry. Proteins are not the major components of wine, although they are essential compounds, contributing to its quality. Indeed, wine proteins are implied in the foaming properties of sparkling wines, the stabilization of tartaric salt precipitation, the interaction with wine volatile compounds, the decrease in wine astringency and color stability, and, unfortunately, in the formation of haze in white wines. Studies have shown that wine proteins mainly originate from grape and yeasts. In literature, wine protein profiling is accomplished according to several methods for the preparation and the detection of wine proteins. These include dialysis, ultrafiltration, precipitation, exclusion chromatography, one- or two-dimensional electrophoresis, capillary electrophoresis, isoelectric focusing, affinity chromatography, immunodetection, high-performance liquid chromatography (HPLC), and fast protein liquid chromatography. These studies indicate that the majority of wine proteins are in the range of 20-30 kDa molecular mass, and proteins that are less abundant remained to be characterized. The stoichiometric maghemite nanoparticles of the invention can be used to rapidly and selectively bind wine proteins for subsequent detection and identification by mass-spectrometry.

Additionally, the stoichiometric maghemite nanoparticles can be used as mutagen protection system against all hexavalent chromium compounds, such as $K_2Cr_2O_7$, which is a potent carcinogen. Maghemite nanoparticles can bind $Cr_2O_7^{2-}$ decreasing the solution concentration of the mutagen, thus exerting a protection against the toxicity of dichromate anion on this effect was revealed on *Salmonella tiphimurium* by Ames test.

A further use of these stoichiometric maghemite nanoparticles is the application thereof as amplification system for quartz crystal immunosensors.

Quartz crystal immunosensors are based on the immobilization of antigen or antibody at the surface of a piezoelectric material. The intrinsic vibration frequency of the support is, then, modulated, following the immunochemical recognition reaction. Piezoelectric immunosensor, termed quartz crystal microbalance (QCM), is a sensitive and quantitative technique for the detection of the chemical reaction between an antibody and an antigen at the surface of the crystal (Janshoff, A. and Steinem, C., 2005, *Methods Mol. Biol.*, 2005, 305, 47-64). The resonant frequency depends on the total oscillating mass and so a mass adsorbed on the surface can be detected as a decrease frequency. Application of QCM technique on the bio-molecules interaction analysis could provide a precise quantitative and dynamic characterization.

In recent years, various nanomaterials, with unique physical, chemical and magnetic properties, have been widely applied in biotechnology for immobilization of the secondary antibody. The immobilization of bioactive molecules on the surfaces of magnetic nanoparticles is of great interest in this respect, because the magnetic properties of these bio-conjugates promise to greatly improve the delivery and recovery of biomolecules in biomedical applications. Iron oxide superparamagnetic nanoparticles, generally stabilized by an organic or inorganic outer shell, have been proposed. Based on their unique physical, chemical, thermal, and mechanical properties, superparamagnetic composite nanoparticles offer unique opportunities in this field.

The development of the iron nanoparticles driveable immunosensor amplification is accomplished by the conjugation of targeting moieties (antibodies) to the particle surface. Due to the high surface area to volume ratio of nanoparticles, many copies of the ligands can be attached. If one particle is able to bind to more than one antibody molecule, the binding affinity of the nanoparticles for the QCM surface increases dramatically.

The application in this field of technology of the stoichiometric maghemite nanoparticles of the invention provides a new generation of amplification system for QCM based immunosensors: the development of an immunosensor based on a piezoelectric transducer to determine tumor markers in human blood. The biosensor will be constituted of a primary antibody immobilized on a piezoelectric quartz. Once the antigen present in the sample has been reacted with the primary antibody, a secondary antibody bound to a nanoparticle will be added to the test solution to enhance the sensor signal. In this case the magnetic iron nanoparticles of the invention are used in order to amplify the signal.

Figure 11:
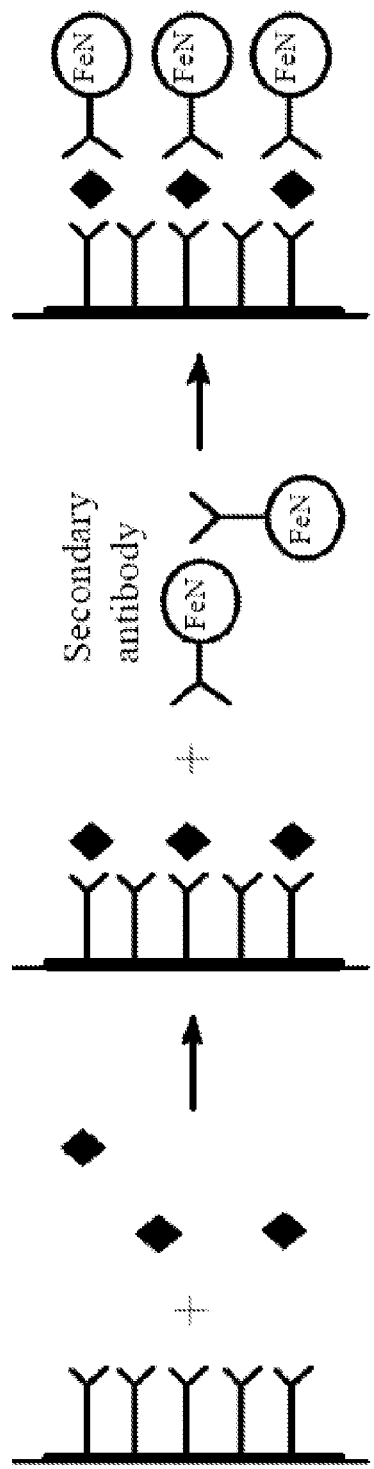
FIG. 11: scheme of a method for detection of an antigen by means of the maghemite superparamagnetic nanoparticles of the invention indicated as FeN.

The stoichiometric superparamagnetic iron nanoparticles (FeN) according to the invention can be additionally used to develop a new methods in order to detect antigens in solution. The method involves the presence of a primary antibody bound to the surface of a piezoelectric crystal and a second antibody bound on iron magnetic nanoparticles (FeN). In the presence of the specific antigen a sandwich is formed (see scheme in FIG. 11).

The response signal of the piezoelectric detection will be amplified by imposing an external magnetic field, which, by interacting with magnetic nanoparticles bound to the surface of the piezoelectric crystal, will dampen the crystal oscillations. The signal acquired will depend on the amount of magnetic nanoparticles bound to the crystal surface, which will depend on the concentration of antigen in solution, and on the intensity of the external magnetic field. In this last case the intensity of the field can be varied to tailor the device sensitivity in order to optimize the system sensitivity in the specific analyte concentration range.

Some considerations about the advantage of the synthesis of nanoparticles according to the present invention can be drawn.

Economy

The synthetic procedure proposed is very cost effective. Most of the already proposed procedures aimed to the synthesis of iron nanoparticles involve the utilization of high purity organic solvents and/or an oxygen free environment, high cost surfactants or expensive instrumentation. In the present case the synthesis is carried out in water, without specific and expensive chemicals and under atmospheric conditions.

No Hazardous Materials Produced During Syntheses

The synthesis of nanoparticles proceed in liquid (water) environment and the release of fine dust, including nanoparticles, into the air is avoided.

Safer Materials and Synthesis

The whole synthesis is carried out in water, avoiding the employment of flammable organic solvents and, at the same time, it was conceived in order to avoid waste generation.

Reduced Use of Reactants and Derivatives

Bottom-up self assembly processes do not require the use of protection/deprotection and associated techniques used in traditional organic chemistry. The overall synthesis is very simple.

The following examples are given for a more complete understanding of the present invention and are set forth to illustrate the invention and are not intended to limit the scope of the same, because variations of the present invention are possible without departing from the spirit and scope of the invention.

EXAMPLES

Example 1

Preparation of Stoichiometrically Pure Maghemite Nanoparticles $FeCl_3.6H_2O$ (10.0 g, 37 mmol) was dissolved in MilliQ grade water (800 mL) under vigorous stirring at room temperature. $NaBH_4$ solution (2 g, 53 mmol) in ammonia (3.5%, 100 mL) was then quickly added to the mixture. The system turned immediately to a black color. Soon after the reduction reaction occurrence, the temperature of the reaction mixture was increased to 100° C. and kept constant for 0.5-5 hours. A first product (coded as Product 1) containing $Fe^{(0)}$ based-nanoparticles was obtained. Product 1 is aged, as prepared, for 24-96 hours in water at room temperature, it gives a black $Fe^{(3+)}$-containing nanoparticle preparation (product 2). This aged black product was separated by imposition of an external magnet. The colorless supernatant (containing salts) was discarded. The black Fe-containing nanoparticles were washed several times with water. Black nanoparticle preparation called "product 2" were transformed into a red brown nanoparticles called "product 3" by ageing in water at room temperature for a time 24-96 hours.

The product 3 was separated by imposition of a magnetic field and washed extensively with water. The resulting powder showed a magnetic response upon exposure to a magnetic field. The final mass of product 3 was 2 g (12.5 mmol) of $\gamma$-$Fe_2O_3$ and a yield of 68% was calculated.

Example 2

Preparation of Stoichiometrically Pure Maghemite Nanoparticles

Alternatively, the same procedure of example 1 can be applied until the preparation of product 2 and product 3 can be produced by drying and curing product 2 at 400° C. for 20 min-2 hours. During the curing process at high temperature, the product turned to a red-brown color. The resulting powder showed a magnetic response upon exposure to a magnetic field. The final mass of product 3 was 2.0 g (12.5 mmol) of $\gamma$-$Fe_2O_3$ and a yield of 68% was calculated.

Example 3

Preparation of Rhodamine B Isothiocyanate Bound to Stoichiometrically Pure Maghemite Nanoparticles Maghemite nanoparticles (product 3) can be superficially and reversibly derivatized by simple incubation in water, in the pH range 2-10, in the presence of rhodamine B isothiocyanate. Depending on the concentration of nanoparticles and rhodamine B isothiocyanate, binding process goes to completion within 30 of minutes.

As an example, a suspension (50 mL) of 100 mg/L nanoparticles binds 2.5 µM (125 nmol) rhodamine B isothiocyanate following the incubation in the presence of 10 µM (500 nmol) rhodamine B isothiocyanate for 1 hour at room temperature. A representative experiment, carried out by spectrophotometry. Alternatively, a suspension (50 mL) of nanoparticles (100 mg/L) binds 30 µM (1.5 µmol) rhodamine B isothiocyanate following the incubation in the presence of 300 µM (15 µmol) rhodamine for 3 hours. Rhodamine B isothiocyanate bound to maghemite nanoparticles (product 3) can be completely released in solution by the addition of 0.5 M ammonia (pH 8.0), final concentration.

Example 4

Preparation of Glucose Oxidase Bound to Maghemite Nanoparticles Functionalized with Rhodamine B Isothiocyanate In the case of glucose oxidase, the binding reaction is performed adding 5 µmol glucose oxidase to 50 mL of a suspension containing 200 mg/L maghemite nanoparticles bound to 2.5 µM rhodamine B isothiocyanate in 0.1M $NaHCO_3$ and stirring the suspension for 2 h at room temperature. The unbound enzyme was removed by extensive nanoparticle washing by external magnetic field application. The enzyme bound to maghemite nanoparticles functionalized with rhodamine B isothiocyanate resulted 100-150 mg/g nanoparticles. The catalytic activity of the immobilized enzyme, measured monitoring hydrogen peroxide production during enzymatic glucose oxidation by spectrophotometry, is 20-30% with respect to the activity showed by free enzyme in solution. Maghemite nanoparticles bearing immobilized glucose oxidase can be used for the preparation of magnetically recoverable nanocatalysts.

Example 5

Preparation of DNA Bound to Stoichiometrically Pure Maghemite Nanoparticles

Paramagnetic maghemite nanoparticles can be superficially and reversibly derivatized by simple incubation in water, in the pH range 2-10, in the presence of DNA. By this way a magnetically drivable nanocarrier can be prepared.

As an example, a suspension (1 mL) of 200 mg/L nanoparticles (product 3) in 0.1 M potassium phosphate buffer at pH 7.0, binds 6.2 µg DNA, following the incubation in the presence of 10 µg DNA for 1 hour at room temperature. DNA concentration was determined by spectrophotometry. Bound DNA can be removed from nanoparticle surface by the addition of 0.5 M ammonia (pH 8.0).

DNA and RNA binding: nanoparticles can be used as purification system for nucleic acids (DNA and RNA) from biological samples and easily detached for subsequent sequencing or analysis. Furthermore, exploiting cell endocytotic process, nanoparticles carrying bound DNA can be used as magnetically addressable transfection vector.

Example 6

Preparation of a Protein Purification System Based on Stoichiometrically Pure Maghemite Nanoparticles As an example of protein purification: 100 mL red wine was incubated overnight in the presence of 200 mg maghemite nanoparticles (product 3). After the incubation period, nanoparticles were washed 3 times in water (within 9 hours) in order to eliminate unbound material, and then treated at 100° C. in the presence of 0.5 M $NH_3$ for 30 min. Different proteins (11 different proteins as revealed by mass spectrometry analysis) bind to nanoparticles. These proteins can be detached from nanoparticle surface by ammonia treatment. Proteins can be determined and identified by mass spectrometry analysis.

Example 7

Application as Amplification System for Quartz Crystal Microbalance

Quartz crystal microbalance, QCMagic, from Elbatech (Italy) interfaced to a driving PC by means of the USB port, equipped with low-volume flow-through reaction chamber, which houses the oscillating crystal, was used. The unit can was tuned to work at 10 MHz.

As an example, the gold surface, constituting the electrical contact of the oscillating crystal, was derivatized by incubation in the presence of an ethanolic solution of 10 mM mercaptoethylamine in order to immobilize a monolayer of mercaptoethylamine on the gold crystal surface according to Chaki (Chaki N. K. and Vijayamohanan K., Bios. Bioelectron, 2002, 17, 1-12). The modified gold surface of the quartz bearing terminal amino groups was derivatized, by carbodiimide chemistry (Nakajima, N. and Ikada, Y, *Bioconjug Chem.*, 1995, 6, 123-128), in order to immobilize biotin on the crystal surface.

The modified quartz crystal was connected to the Quartz Crystal Microbalance, QCMagic (from Elbatech, Italy) and inserted in a flow cell running at 1 ml/h by using a syringe pump, using 0.1M potassium buffer, pH 7.0, as carrier solution.

The flow cell was connected to an injection valve, equipped with a 100 µL sample loop. The biotinyl-derivatized quartz crystal was treated with an avidin solution (5 µg/ml) in order to bind to the immobilized biotin on the crystal surface. Biotin is recognized by avidin, being the dissociation constant $K_D \approx 10^{-15}$ M, making it one of the strongest known non-covalent bond. Avidin is a tetrameric protein containing four identical subunits (homotetramer), each of which can bind to one biotin molecule with a high degree of affinity and specificity. Following the injection of the avidin solution the resonance frequency change of about 2-5 Hz. In the presence of a solution of biotinyl-derivatized superparamagnetic maghemite nanoparticles previously prepared, modified maghemite particles bind to avidin immobilized on the crystal surface, leading to a change in the piezoelectric crystal resonance frequency of 40-50 Hz. The crystal response upon nanoparticle binding can be amplified by the application of an external magnetic field. Under the described conditions, the crystal resonance frequency variation was amplified 3 times by the application of an external magnet at 2 cm.

Example 8

Application as Mutagen Protection System

Chromium is a vital industrial material for which there is no ready substitute. Chromium has been widely detected in groundwater and soils, particularly at sites associated with metal plating, wood processing, leather tanning, metal corrosion inhibition, and pigment production. Chromium in natural waters exists primarily in +3 and +6 valence states. Hexavalent chromium (Cr(VI)), such as chromate [$CrO_4^{2-}$, $HCrO_4^-$] is highly soluble reactive and mobile in aquatic systems. Compared to the much less soluble Cr(III) species, Cr(VI) species is much more mobile, toxic and carcinogenic ( ).

Remediation of chromium-contaminated soil and groundwater has largely followed the pathway of reduction and precipitation/immobilization.

Stoichiometric maghemite nanoparticles, due to their high surface to volume ratio, are able to immobilize Cr(VI) and they can be used as protection system against mutagen effect of dichromate ion.

As an example, when $Cr_2O_7^{2-}$ (40 µM) is added to a culture of *Salmonella typhimurium* (TA 100 strain) it directly induces gene mutations. Such a mutagen effect of $K_2Cr_2O_7$, measured by an Ames Test, can be reverted in a dose dependent manner as a function of the concentration of maghemite nanoparticles. At a dose above 4.5 mg/L nanoparticles inhibit completely the mutagen effect of potassium dichromate, suggesting their utilization as a protection system against this mutagen substance in the environment.

The invention claimed is:
1. The FE-based composition of matter consisting of maghemite (γ-$Fe_2O_3$) superparamagnetic nanoparticles obtained with the method of preparation comprising the steps of:
   a) reducing $Fe^{(3+)}$ ions to a Fe-based composition of matter comprising amorphous $Fe^{(0)}$-containing nanoparticles by treating at room temperature aqueous solutions of $Fe^{(3+)}$ salts with an ammonia aqueous solution of sodium borohydride ($NaBH_4$) and then heating the reaction mixture up to 100° C. and keeping the same at this temperature for a time comprised from 0.5 to 5.0 hours;
   b) oxidizing the Fe-based composition comprising amorphous $Fe^{(0)}$-containing nanoparticles obtained in a) to a Fe-based composition of matter comprising the black maghemite $Fe^{(3+)}$-containing nanoparticles by aging under stirring, at room temperature, a water suspension of said composition for a time comprised from 24 to 96 hours;
   c) ageing the Fe-based composition of matter comprising the black maghemite $Fe^{(3+)}$ containing nanoparticles obtained in b) to a stoichiometrically pure maghemite (γ-$Fe_2O_3$) nanoparticles under stirring at room temperature a water suspension of the same for a time comprised from 24 to 96 hours; or
      annealing by heating the Fe-based composition of matter comprising the black maghemite $Fe^{(3+)}$-contain- ing nanoparticles obtained in b) at temperatures comprised from 350° to 450° C. for a time comprised from 20 min. to 2 hours;

d) separating and washing the stoichiometrically pure maghemite ($\gamma$-Fe$_2$O$_3$) superparamagnetic nanoparticles obtained, wherein the nanoparticles include a size distribution of from 5 to 50 nm and a mean size of from 10 to 12 nm and wherein the nanoparticles include a polydispersity index in water of from 1.02 to 1.05.

2. The FE-based composition of matter consisting of maghemite ($\gamma$-Fe$_2$O$_3$) superparamagnetic nanoparticles obtained with the method of preparation comprising the steps of:

a) reducing Fe$^{(3+)}$ ions to a Fe-based composition of matter comprising amorphous Fe$^{(0)}$-containing nanoparticles by treating at room temperature aqueous solutions of Fe$^{(3+)}$ salts with an ammonia aqueous solution of sodium borohydride (NaBH$_4$) and then heating the reaction mixture up to 100° C. and keeping the same at this temperature for a time comprised from 0.5 to 5.0 hours;

b) oxidizing the Fe-based composition comprising amorphous Fe$^{(0)}$-containing nanoparticles obtained in a) to a Fe-based composition of matter comprising the black maghemite Fe$^{(3+)}$-containing nanoparticles by aging under stirring, at room temperature, a water suspension of said composition for a time comprised from 24 to 96 hours;

c) ageing the Fe-based composition of matter comprising the black maghemite Fe$^{(3+)}$-containing nanoparticles obtained in b) to a stoichiometrically pure maghemite ($\gamma$-Fe$_2$O$_3$) nanoparticles under stirring at room temperature a water suspension of the same for a time comprised from 24 to 96 hours; or annealing by heating the Fe-based composition of matter comprising the black maghemite Fe$^{(3+)}$-containing nanoparticles obtained in b) at temperatures comprised from 350° to 450° C. for a time comprised from 20 min. to 2 hours;

d) separating and washing the stoichiometrically pure maghemite ($\gamma$-Fe$_2$O$_3$) superparamagnetic nanoparticles obtained, wherein the nanoparticles include a size distribution of from 5 to 50 nm and a maximum and a minimum magnetization (at +7 and −7 T) at 2 K of 77 and −77 emu/g, respectively, a coercivity, under the same conditions, of 220 and −220 Oe, and a remnant magnetization of 21 and −21 emu/g; and a surface zeta ($\xi$) potential (as electrokinetic potential in colloidal systems), measured in potassium phosphate buffer at pH 7.4, in a range −10 to −30 mV.

3. The Fe-based composition of matter consisting of maghemite $\gamma$-Fe$_2$O$_3$ superparamagnetic nanoparticles according to claim 1 for use as reagents for detection and/or binding inorganic and/or organic molecules Including the step of contacting the maghemite $\gamma$-Fe$_2$O$_3$ superparamagnetic nanoparticles with the inorganic and/or organic molecules reversible binding the inorganic and/or organic molecules without surface modification by macromolecule shielding forming a reagent and detecting the inorganic and/or organic molecules.

4. The Fe-based composition of matter consisting of maghemite $\gamma$-Fe$_2$O$_3$ superparamagnetic nanoparticles according to claim 1 for use as nanocarriers and/or nanocatalysts Including the step of contacting the maghemite $\gamma$-Fe$_2$O$_3$ superparamagnetic nanoparticles with the inorganic and/or organic molecules reversible binding the inorganic and/or organic molecules without surface modification by macromolecule shielding forming nanocarriers and/or nanocatalysts and applying a magnetic field to drive the nanocarriers and/or nanocatalysts.

5. The Fe-based composition of matter consisting of maghemite $\gamma$-Fe$_2$O$_3$ superparamagnetic nanoparticles according to claim 1 for use as a magnetic amplification means for piezoelectric detection including the step of contacting the maghemite $\gamma$-Fe$_2$O$_3$ superparamagnetic nanoparticles with inorganic and/or organic molecules reversibly binding the inorganic and/or organic molecules without surface modification by macromolecule shielding forming a magnetic amplification means for piezoelectric detection and applying a magnetic field.

6. The Fe-based composition of matter consisting of maghemite $\gamma$-Fe$_2$O$_3$ superparamagnetic nanoparticles according to claim 2 for use as reagents for detection and/or binding inorganic and/or organic molecules including the step of contacting the maghemite $\gamma$-Fe$_2$O$_3$ superparamagnetic nanoparticles with the inorganic and/or organic molecules reversibly binding the inorganic and/or organic molecules without surface modification by macromolecule shielding forming a reagent and detecting the inorganic and/or organic molecules.

7. The Fe-based composition of matter consisting of maghemite $\gamma$-Fe$_2$O$_3$ superparamagnetic nanoparticles according to claim 2 for use as nanocarriers and/or nanocatalysts including the step of contacting the maghemite $\gamma$-Fe$_2$O$_3$ superparamagnetic nanoparticles with the inorganic and/or organic molecules reversibly binding the inorganic and/or organic molecules without surface modification by macromolecule shielding forming nanocarriers and/or nanocatalysts and applying a magnetic field to drive the nanocarriers and/or nanocatalysts.

8. The Fe-based composition of matter consisting of maghemite $\gamma$-Fe$_2$O$_3$ superparamagnetic nanoparticles according to claim 2 for use as a magnetic amplification means for piezoelectric detection including the step of contacting the maghemite $\gamma$-Fe$_2$O$_3$ superparamagnetic nanoparticles with inorganic and/or organic molecules reversibly binding the inorganic and/or organic molecules without surface modification by macromolecule shielding forming a magnetic amplification means for piezoelectric detection and applying a magnetic field.

9. The Fe-based composition of matter consisting of maghemite $\gamma$-Fe$_2$O$_3$ superparamagnetic nanoparticles according to claim 1, characterized by:

the stoichiometric formula of $(Fe^{3+})^T(Fe^{3+}_{5/3}\ o_{1/3})^H O_4$, where "o" stands for vacancies, and T and H for tetrahedral and octahedral positioning, as determined by zero field and in-field (5 T) Mössbauer spectroscopy in the temperature range 5-298 K.

10. The Fe-based composition of matter consisting of maghemite $\gamma$-Fe$_2$O$_3$ superparamagnetic nanoparticles according to claim 2, characterized by:

the stoichiometric formula of $(Fe^{3+})^T(Fe^{3+}_{5/3}\ o_{1/3})^H O_4$, where "o" stands for vacancies, and T and H for tetrahedral and octahedral positioning, as determined by zero field and in-field (5 T) Mössbauer spectroscopy in the temperature range 5-298 K.

\* \* \* \* \*

UNITED STATES PATENT AND TRADEMARK OFFICE
CERTIFICATE OF CORRECTION

PATENT NO. : 8,980,218 B2
APPLICATION NO. : 13/811112
DATED : March 17, 2015
INVENTOR(S) : Umberto Russo et al.

It is certified that error appears in the above-identified patent and that said Letters Patent is hereby corrected as shown below:

On The Title Page, Item (73) Assignee should read

(73) Assignees – Delete "Massimiliano Margo", Insert -- Massimiliano Magro--

In The Specification:

At column 1, line number 63, Delete "sok gel", Insert --sol gel--

At column 3, line number 4, Delete "a method", Insert --to provide a method--

At column 3, line number 22, Delete "ageing", Insert --aging--

At column 4, line number 10, Delete "–10÷–30 mV", Insert -- –10 to –30 mV--

Signed and Sealed this
Twenty-ninth Day of March, 2016

Michelle K. Lee
*Director of the United States Patent and Trademark Office*